United States Patent
Hsieh et al.

(10) Patent No.: US 10,382,184 B2
(45) Date of Patent: Aug. 13, 2019

(54) METHOD OF HANDLING COMMUNICATION OPERATION AND RELATED COMMUNICATION DEVICE

(71) Applicant: Industrial Technology Research Institute, Hsinchu (TW)

(72) Inventors: Chia-Wen Hsieh, New Taipei (TW); Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 856 days.

(21) Appl. No.: 14/452,537

(22) Filed: Aug. 6, 2014

(65) Prior Publication Data
US 2015/0043397 A1   Feb. 12, 2015

Related U.S. Application Data

(60) Provisional application No. 61/863,926, filed on Aug. 9, 2013.

(51) Int. Cl.
| H04L 5/14 | (2006.01) |
| H04L 1/18 | (2006.01) |
| H04L 5/00 | (2006.01) |

(52) U.S. Cl.
CPC .............. H04L 5/14 (2013.01); H04L 1/1812 (2013.01); H04L 1/1861 (2013.01); H04L 5/001 (2013.01); H04L 5/0055 (2013.01); H04L 5/1469 (2013.01)

(58) Field of Classification Search
CPC ....... H04L 5/14; H04L 1/1861; H04L 5/0055; H04L 1/1812; H04L 5/001; H04L 5/1469; H04W 72/14

See application file for complete search history.

(56) References Cited

U.S. PATENT DOCUMENTS

| 2013/0028149 A1 | 1/2013 | Chen | |
| 2013/0034028 A1 | 2/2013 | Chen | |
| 2013/0051289 A1 | 2/2013 | Hsieh | |
| 2013/0343239 A1* | 12/2013 | Damnjanovic | H04L 5/001 370/280 |
| 2014/0307597 A1* | 10/2014 | Kim | H04L 5/0055 370/280 |
| 2014/0369242 A1* | 12/2014 | Ng | H04W 72/0453 370/280 |
| 2015/0003302 A1* | 1/2015 | Ekpenyong | H04W 72/14 370/280 |
| 2015/0003304 A1* | 1/2015 | Wu | H04L 1/1854 370/280 |

(Continued)

FOREIGN PATENT DOCUMENTS

WO   WO2013/073918 A1 *   5/2013   ........... H04L 1/1861

*Primary Examiner* — Ian N Moore
*Assistant Examiner* — Justin T Van Roie
(74) *Attorney, Agent, or Firm* — Winston Hsu

(57) ABSTRACT

A method of handling a communication operation for a communication device comprising performing a reception in a first subframe of a time-division duplexing (TDD) carrier from a network; and performing a transmission for responding the reception via a second subframe of a uplink (UL) carrier to the network; wherein the UL carrier is a frequency-division duplexing (FDD) UL carrier, or is another TDD carrier with an UL/downlink (DL) configuration where all subframes are UL subframes.

27 Claims, 28 Drawing Sheets

(56) References Cited

U.S. PATENT DOCUMENTS

| | | | |
|---|---|---|---|
| 2015/0085782 A1* | 3/2015 | Seo | H04L 1/1861 370/329 |
| 2016/0037552 A1* | 2/2016 | Svedman | H04L 45/02 370/329 |
| 2017/0005774 A1* | 1/2017 | Choi | H04L 5/0073 |

* cited by examiner

| UL/DL configuration | Subframe number |  |  |  |  |  |  |  |  |  |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

FIG. 1 PRIOR ART

| Duplex mode | | Maximum number of HARQ processes ($M_{DL\_HARQ}$) |
|---|---|---|
| FDD | | 8 |
| TDD | UL/DL configuration 0 | 4 |
| | UL/DL configuration 1 | 7 |
| | UL/DL configuration 2 | 10 |
| | UL/DL configuration 3 | 9 |
| | UL/DL configuration 4 | 12 |
| | UL/DL configuration 5 | 15 |
| | UL/DL configuration 6 | 6 |

FIG. 15

| UL/DL configuration of TDD carrier | Maximum number of HARQ processes ($M_{DL\_HARQ}$) when a TDD carrier and a UL carrier are jointly operated |
|---|---|
| 0 | 4 |
| 1 | 6 |
| 2 | 7 |
| 3 | 7 |
| 4 | 8 |
| 5 | 8 |
| 6 | 5 |

FIG. 17

| Reference Timeline | Maximum number of HARQ processes ($M_{DL\_HARQ}$) when a TDD carrier and a DL carrier are jointly operated |
|---|---|
| UL/DL Configuration 0 | 10 |
| UL/DL Configuration 1 | 11 |
| UL/DL Configuration 2 | 12 |
| UL/DL Configuration 3 | 15 |
| UL/DL Configuration 4 | 16 |
| UL/DL Configuration 5 | 16 |
| UL/DL Configuration 6 | 11 |

FIG. 28

METHOD OF HANDLING COMMUNICATION OPERATION AND RELATED COMMUNICATION DEVICE

CROSS REFERENCE TO RELATED APPLICATIONS

This application claims the benefit of U.S. Provisional Application No. 61/863,926, filed on Aug. 9, 2013 and incorporated herein by reference.

BACKGROUND OF THE INVENTION

1. Field of the Invention

The application relates to a method utilized in a wireless communication system and related communication device, and more particularly, to a method of handling a communication operation and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmissions/reception, uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

The CA is introduced to the LTE-A system by which more than one carrier (e.g., component carriers, serving cells) can be aggregated to achieve a wide-band transmission. The CA increases bandwidth flexibility by aggregating the carriers. When a UE is configured with the CA, the UE has the ability to receive and/or transmit packets via one or multiple carriers to increase throughput.

Different from the LTE/LTE-A system operating in a frequency-division duplexing (FDD) mode (or simply FDD system), directions of subframes of a frequency band in the LTE/LTE-A system operating in a time-division duplexing (TDD) mode (or simply TDD system) may be different. That is, the subframes in the same frequency band are divided into UL subframes, downlink (DL) subframes and special subframes according to the UL/DL configuration specified in the 3GPP standard.

FIG. 1 is a table 102 of the UL/DL configuration with subframes and corresponding directions. In FIG. 1, 7 UL/DL configurations are shown, wherein each of the UL/DL configurations indicates a set of directions (i.e., transmission directions) for 10 subframes, respectively. Each subframe is indicated with respective subframe number (i.e., subframe index) in FIG. 1. In detail, "U" represents that the subframe is a UL subframe where UL data is transmitted, and "D" represents that the subframe is a DL subframe where DL data is transmitted. "S" represents that the subframe is a special subframe where control information and maybe data (according to the special subframe configuration) is transmitted, and the special subframe can also be seen as the DL subframe in the prior art. Note that the eNB may configure a UL/DL configuration to a UE via a higher layer signaling (e.g., System Information Block Type 1 (SIB1)) or a physical layer signaling (e.g., DL control information (DCI)).

According to the 3GPP standards which have been developed, the UE cannot operate in the TDD mode and the FDD mode at the same time. That is, the UE can only perform a transmission/reception via TDD carrier(s), or can only perform the transmission/reception via FDD carrier(s). Bandwidth efficiency and flexibility are limited, when the UE can only use a specific type of carriers. Thus, it is expected that the UE may perform the transmission/reception via the TDD carrier(s) and the FDD carrier(s) jointly, i.e., TDD-FDD joint operation is expected. However, rules according to which the TDD carrier(s) and FDD carrier(s) are used are different. The UE cannot simply perform the transmission/reception via the TDD carrier(s) and the FDD carrier(s) at the same time.

Thus, realization of a communication operation (e.g., TDD-FDD joint operation) is an important problem to be solved.

SUMMARY OF THE INVENTION

The present invention therefore provides a method and related communication device for handling the communication operation to solve the abovementioned problem.

A method of handling a communication operation for a communication device comprising performing a reception in a first subframe of a time-division duplexing (TDD) carrier from a network; and performing a transmission for responding the reception via a second subframe of a uplink (UL) carrier to the network; wherein the UL carrier is a frequency-division duplexing (FDD) UL carrier, or is another TDD carrier with an UL/downlink (DL) configuration where all subframes are UL subframes.

A method of handling a communication operation for a communication device comprising performing a transmission in a first subframe of a uplink (UL) carrier to a network; and performing a reception for responding the transmission via a second subframe of a time-division duplexing (TDD) carrier from the network; wherein the UL carrier is a frequency-division duplexing (FDD) UL carrier, or is another TDD carrier with an UL/downlink (DL) configuration where all subframes are UL subframes.

A method of handling a communication operation for a communication device comprising performing a reception in a first subframe of a downlink (DL) carrier from a network; and performing a transmission for responding the reception via a second subframe of a time-division duplexing (TDD) carrier to the network; wherein the DL carrier is a frequency-division duplexing (FDD) DL carrier, or is another TDD carrier with an uplink (UL)/DL configuration where all subframes are DL subframes.

A method of handling a communication operation for a communication device comprising performing a transmission in a first subframe of a TDD carrier to a network; and performing a reception for responding the transmission via a second subframe of a downlink (DL) carrier from the network; wherein the DL carrier is a frequency-division duplexing (FDD) DL carrier, or is another TDD carrier with an uplink (UL)/DL configuration where all subframes are DL subframes.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a table of the UL/DL configuration with subframes and corresponding directions.

FIG. 15 is a table of $M_{DL\_HARQ}$ according to an example of the invention.

FIG. 17 is a table of $M_{DL\_HARQ}$ according to an example of the invention.

FIG. 28 is a table of $M_{DL\_HARQ}$ according to an example of the invention.

DETAILED DESCRIPTION

Figure 2:
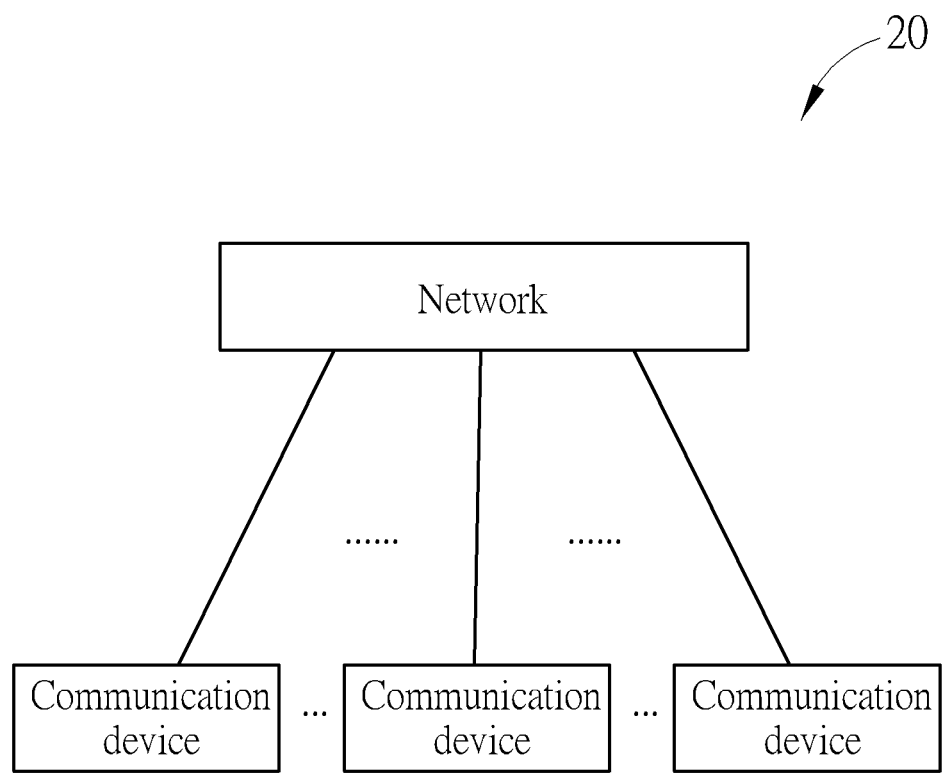
FIG. 2 is a schematic diagram of a wireless communication system according to an example of the present invention.

FIG. 2 is a schematic diagram of a wireless communication system 20 according to an example of the present invention. The wireless communication system 20 is briefly composed of a network and a plurality of communication devices. The wireless communication system 20 supports a time-division duplexing (TDD) mode and/or a frequency-division duplexing (FDD) mode. That is, the network and a communication device may communicate with each other via FDD carrier(s) and/or TDD carrier(s). In addition, the wireless communication system 20 may support a carrier aggregation (CA). That is, the network and a communication device may communicate with each other via multiple carriers including a primary carrier (e.g., primary component carrier, primary cell) and one or more secondary carriers (e.g., secondary component carriers, secondary cells). For example, the primary carrier may be a TDD carrier, and a secondary carrier may be a FDD carrier. In another example, the primary carrier may be the FDD carrier, and the secondary carrier may be the TDD carrier.

In FIG. 2, the network and the communication devices are simply utilized for illustrating the structure of the wireless communication system 20. Practically, the network can be a universal terrestrial radio access network (UTRAN) comprising a plurality of Node-Bs (NBs) in a universal mobile telecommunications system (UMTS). In another example, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network. A communication device can be a user equipment (UE), a half-duplex UE, a mobile phone, a laptop, a tablet computer, an electronic book or a portable computer system but is not limited. Besides, the network and the communication device can be seen as a transmitter or a receiver according to direction, e.g., for an uplink (UL), the communication device is the transmitter and the network is the receiver, and for a downlink (DL), the network is the transmitter and the communication device is the receiver. More specifically, for the network, the direction of the transmission is DL, and the direction of the reception is UL. For the communication device, the direction of the transmission is UL, and the direction of the reception is DL.

Figure 3:
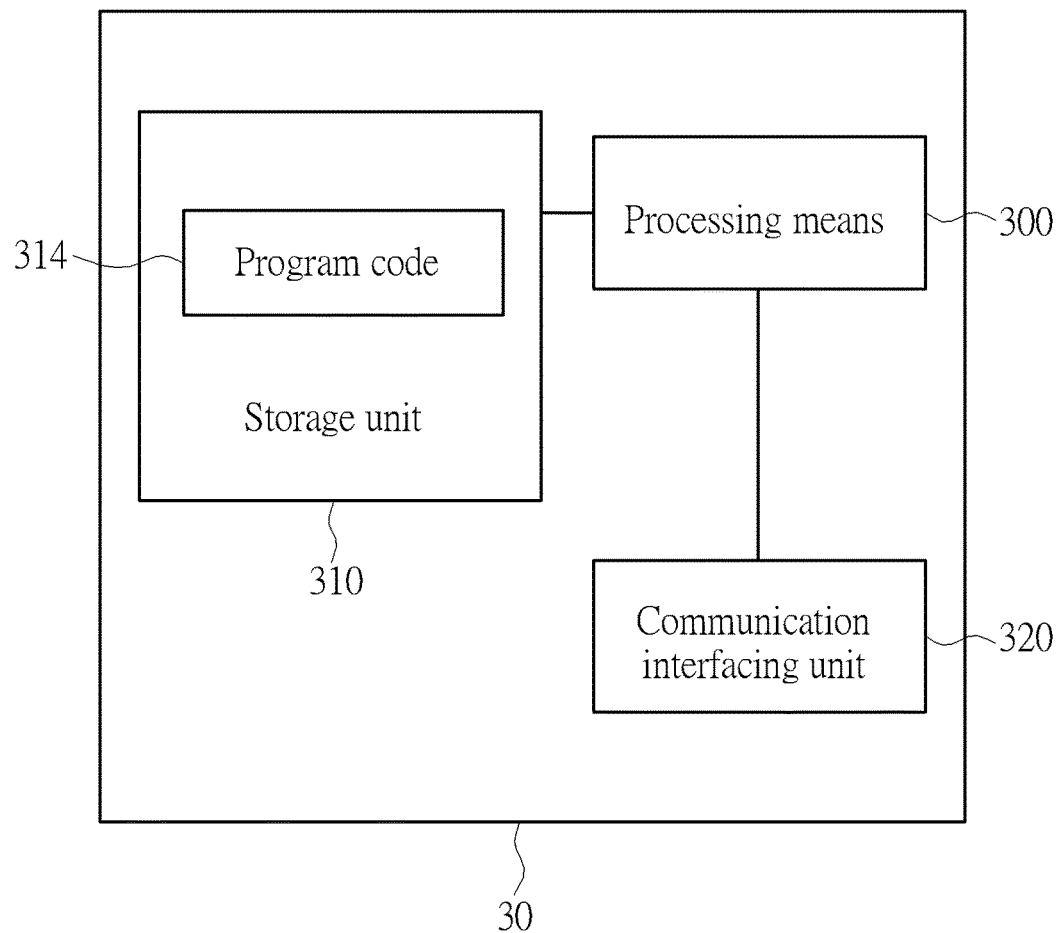
FIG. 3 is a schematic diagram of a communication device according to an example of the present invention.

FIG. 3 is a schematic diagram of a communication device 30 according to an example of the present invention. The communication device 30 can be a communication device or the network shown in FIG. 2, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that can store a program code 314, accessed and executed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals (e.g., messages or packets) according to processing results of the processing means 300.

Figure 4:
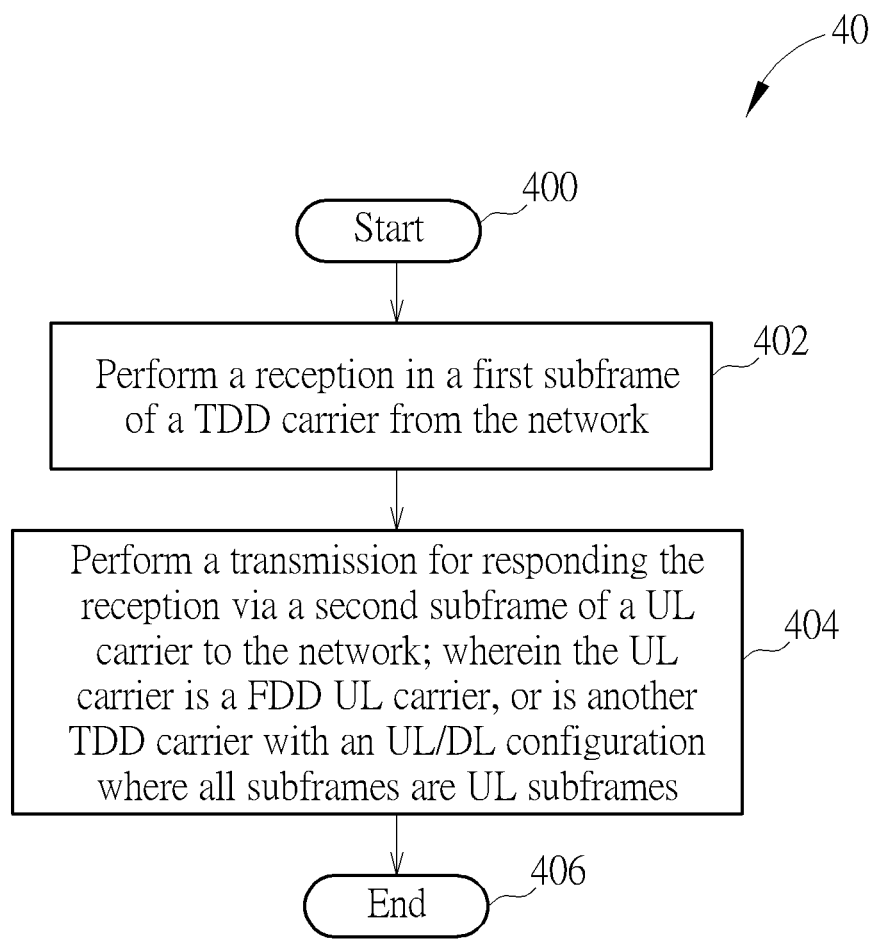
FIG. 4 is a flowchart of a process according to an example of the present invention.

FIG. 4 is a flowchart of a process 40 according to an example of the present invention. The process 40 may be utilized in a communication device shown in FIG. 2, for handling a communication operation. The process 40 may be compiled into the program code 314 and includes the following steps:

Step 400: Start.

Step 402: Perform a reception in a first subframe of a TDD carrier from the network.

Step 404: Perform a transmission for responding the reception via a second subframe of a UL carrier to the network; wherein the UL carrier is a FDD UL carrier, or is another TDD carrier with an UL/DL configuration where all subframes are UL subframes.

Step 406: End.

According to the process 40, the communication device performs a reception in a first subframe of a TDD carrier from the network, and performs a transmission for responding the reception via a second subframe of a UL carrier to the network. The UL carrier may be a FDD UL carrier, or may be another TDD carrier with an UL/DL configuration where all subframes are UL subframes. That is, the transmission and the reception may be performed in different types of carriers. Note that the first subframe may be in a first frame, and the second subframe may be in a second frame. The first frame and the second frame may be the same frame or different frames, and may be determined according to the same rule used for determined the first subframe and the second subframe. In addition, subframe indices of the first subframe and the second subframe may be the same, if the first subframe and the second subframe are in different frames. In the process 40, the UL carrier may be a primary carrier (e.g., primary component carrier, primary cell), and the TDD carrier may be a secondary carrier (e.g., secondary component carrier, secondary cell).

In one example, the TDD carrier may be another FDD (e.g., UL or DL) carrier. In another example, the TDD carrier may be another FDD (e.g., UL or DL) carrier configured with a TDD UL/DL configuration. For example, the reception may include at least one packet, and the transmission may include a hybrid automatic repeat request (HARQ) feedback for responding the at least one packet in the reception. In this situation, a HARQ process number of the HARQ feedback should be not greater than a maximum number of HARQ processes, $M_{DL\_HARQ}$ determined according to the reception and the transmission. For example, $M_{DL\_HARQ}$ for a UL/DL configuration 4 may be 8, and/or $M_{DL\_HARQ}$ for a UL/DL configuration 5 may be 8. In another example, the reception may include a UL grant, and the transmission is performed according to the UL grant.

A method according to which the second subframe in the process 40 is determined is not limited. For example, the second subframe may be a (e.g., predetermined) number of subframes after the first subframe, and the number of subframes may be a constant regardless of a subframe index of the first subframe. That is, subframe indices of the first subframe and the second subframe may be n and (n+k), respectively, wherein n and k are positive integers. Taking FDD rule as an example, k is 4 regardless of the subframe index of the first subframe. In another example, the second subframe may be determined according to a reference timeline. The reference timeline may be determined according to a UL/DL configuration of the TDD carrier, or may be determined according to a UL/DL configuration configured by a higher layer signaling (e.g., radio resource control (RRC) signaling). In another example, the reference timeline may be a newly defined timeline (e.g., modified from a timeline of the UL/DL configuration of the TDD carrier). The reception may be performed via a physical DL shared channel (PDSCH) of the first subframe of the TDD carrier or via a physical DL control channel (PDCCH) of the first subframe of the TDD carrier. The transmission may be performed via a physical UL shared channel (PUSCH) of the second subframe of the UL carrier or via a physical UL control channel (PUCCH) of the second subframe of the UL carrier.

Thus, the communication operation (e.g., TDD-FDD joint operation) can be realized by the communication device according to the above description. Bandwidth efficiency and flexibility of the wireless communication system can be improved.

It should be noted that A FDD UL carrier is used for illustrating the following examples. However, as stated previously, similar examples can be obtained by replacing the FDD UL carrier by a TDD carrier with an UL/DL configuration where all subframes are UL subframes.

Figure 5:
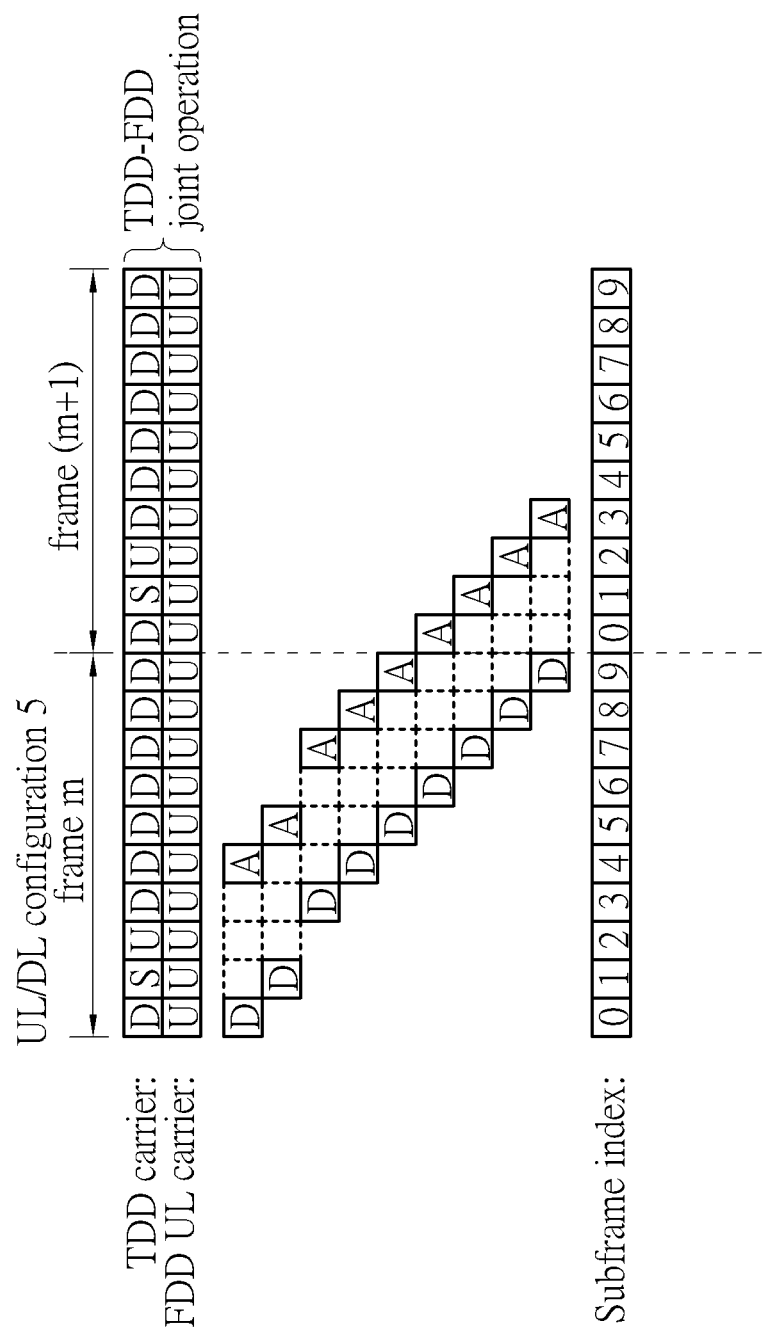
FIG. 5 is a schematic diagram of HARQ-feedback timeline for HARQ feedback(s) according to an example of the present invention.

FIG. 5 is a schematic diagram of HARQ-feedback timeline for HARQ feedback(s) according to an example of the present invention. A TDD carrier and a FDD UL carrier are shown in FIG. 5, wherein a UL/DL configuration of the TDD carrier is the UL/DL configuration 5. The communication device performs a reception (e.g., of packet (s), message(s) or control information) according to a timeline of the UL/DL configuration 5. According to the previous description, the communication device may receive one or more packets in a first subframe of the TDD carrier with subframe index n (e.g., 0, 1, 3, 4, 5, 6, 7, 8 and/or 9) from the network. Note that the subframe of the TDD carrier with subframe index 2 is a UL subframe according to the timeline of the UL/DL configuration 5, and a reception should not happen in the subframe. Then, the communication device may transmit a HARQ feedback in a second subframe of the FDD UL carrier with a subframe index (n+4) (e.g., 0, 1, 2, 3, 4, 5, 7, 8 and/or 9) to the network, to respond (i.e., acknowledge) the reception. In the above description, the second subframe is 4 subframes after the first subframe regardless of the subframe index of the first subframe. For example, the communication device may transmit a HARQ feedback in a subframe of frame m of the FDD UL carrier with a subframe index 5, to respond the reception occurred in a subframe of frame m of the TDD carrier with subframe index 1. In other words, a rule for responding a HARQ feedback in the FDD system is utilized in the present example, to handle the communication operation.

Figure 6:
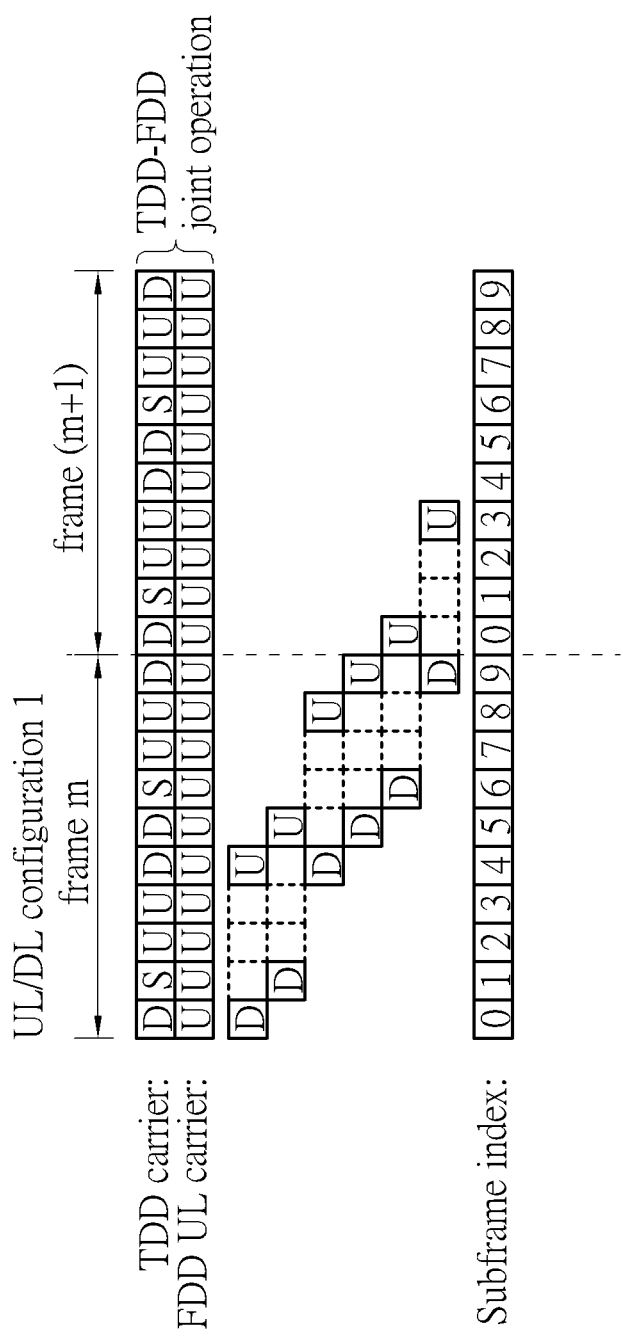
FIGS. 6-9 are schematic diagrams of scheduling timelines for a UL grant according to examples of the present invention.

FIG. 6 is a schematic diagram of scheduling timeline for a UL grant according to an example of the present invention. A TDD carrier and a FDD UL carrier are shown in FIG. 6, wherein a UL/DL configuration of the TDD carrier is the UL/DL configuration 1. The communication device performs a reception (e.g., of packet (s), message (s) or control information) according to a timeline of the UL/DL configuration 1. According to the previous description, the communication device may receive a UL grant in a first subframe of the TDD carrier with subframe index n (e.g., 0, 1, 4, 5, 6 and/or 9) from the network. Note that the subframes with subframe indices 2, 3, 7 and 8 are UL subframes of the TDD carrier according to the timeline of the UL/DL configuration 1, and receptions should not happen in the subframes. Then, the communication device may transmit a packet in a second subframe of the FDD UL carrier with a subframe index (n+4) (e.g., 0, 3, 4, 5, 8 and/or 9) to the network, to respond the UL grant. In the above description, the second subframe is 4 subframes after the first subframe regardless of the subframe index of the first subframe. No transmission should happen in subframes of the FDD UL carrier with subframe indices 1, 2, 6 and 7, because these subframes are not corresponding to DL subframes according to the timeline of the UL/DL configuration 1. For example, the communication device may transmit a packet in a subframe of frame m of the FDD UL carrier with a subframe index 8, to respond the UL grant received in a subframe of frame m of the TDD carrier with subframe index 4. In other words, a rule for responding a UL grant in the FDD system is utilized in the present example, to handle the communication operation.

Figure 7:
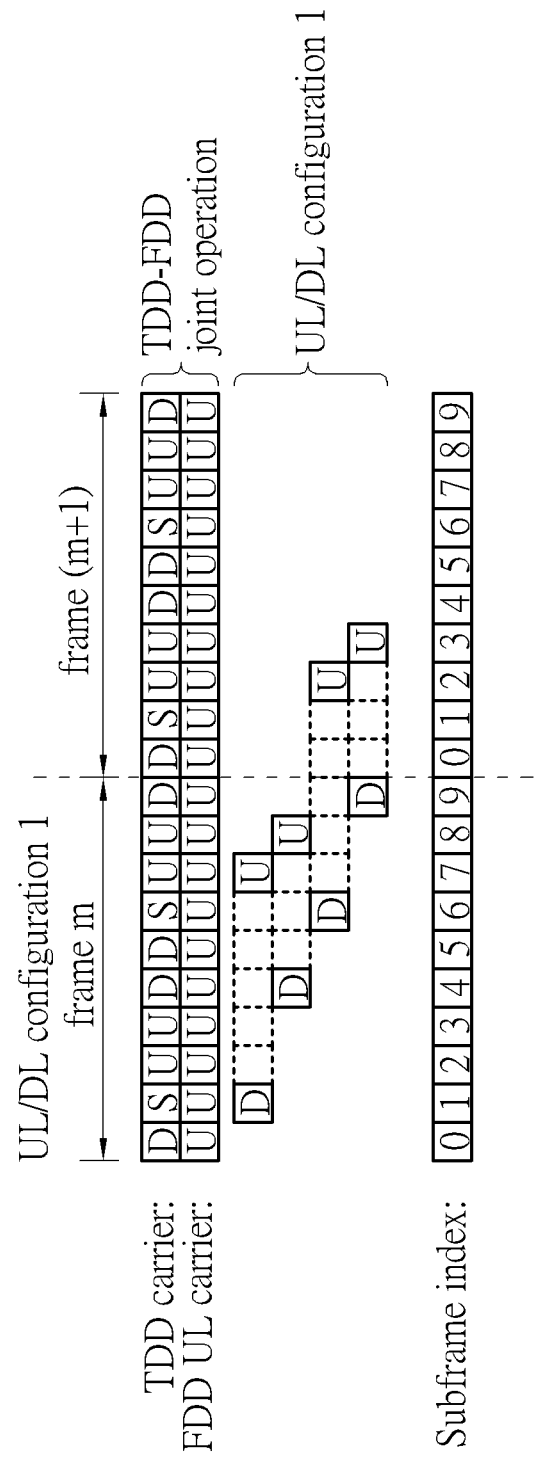

FIG. 7 is a schematic diagram of scheduling timeline for a UL grant according to an example of the present invention. A TDD carrier and a FDD UL carrier are shown in FIG. 7, wherein a UL/DL configuration of the TDD carrier is the UL/DL configuration 1 (e.g., system information block type 1 (SIB1) configuration). The communication device performs a reception (e.g., of packet (s), message (s) or control information) according to a reference timeline which is a timeline of the UL/DL configuration 1. According to the previous description, the communication device may receive a UL grant in a first subframe of the TDD carrier with subframe index n (e.g., 1, 4, 6 and/or 9) from the network. Note that the subframes of the TDD carrier with subframe indices 2, 3, 7 and 8 are UL subframes according to the timeline of the UL/DL configuration 1, and receptions should not happen in the subframes. Then, the communication device may transmit a packet in a second subframe of the FDD UL carrier with subframe index k (e.g., 2, 3, 7 and/or 8) according to the timeline of the UL/DL configuration 1 to the network, to respond the UL grant. No transmission should happen in subframes of the FDD UL carrier with subframe indices 0, 1, 4, 5, 6 and 9, because these subframes are not corresponding to UL subframes according to the timeline of the UL/DL configuration 1. For example, the communication device may transmit a packet in a subframe of frame m of the FDD UL carrier with a subframe index 7, to respond the UL grant received in a subframe of frame m of the TDD carrier with subframe index 1. In other words, a rule for responding a UL grant in the TDD system is utilized in the present example, to handle the communication operation.

Figure 8:
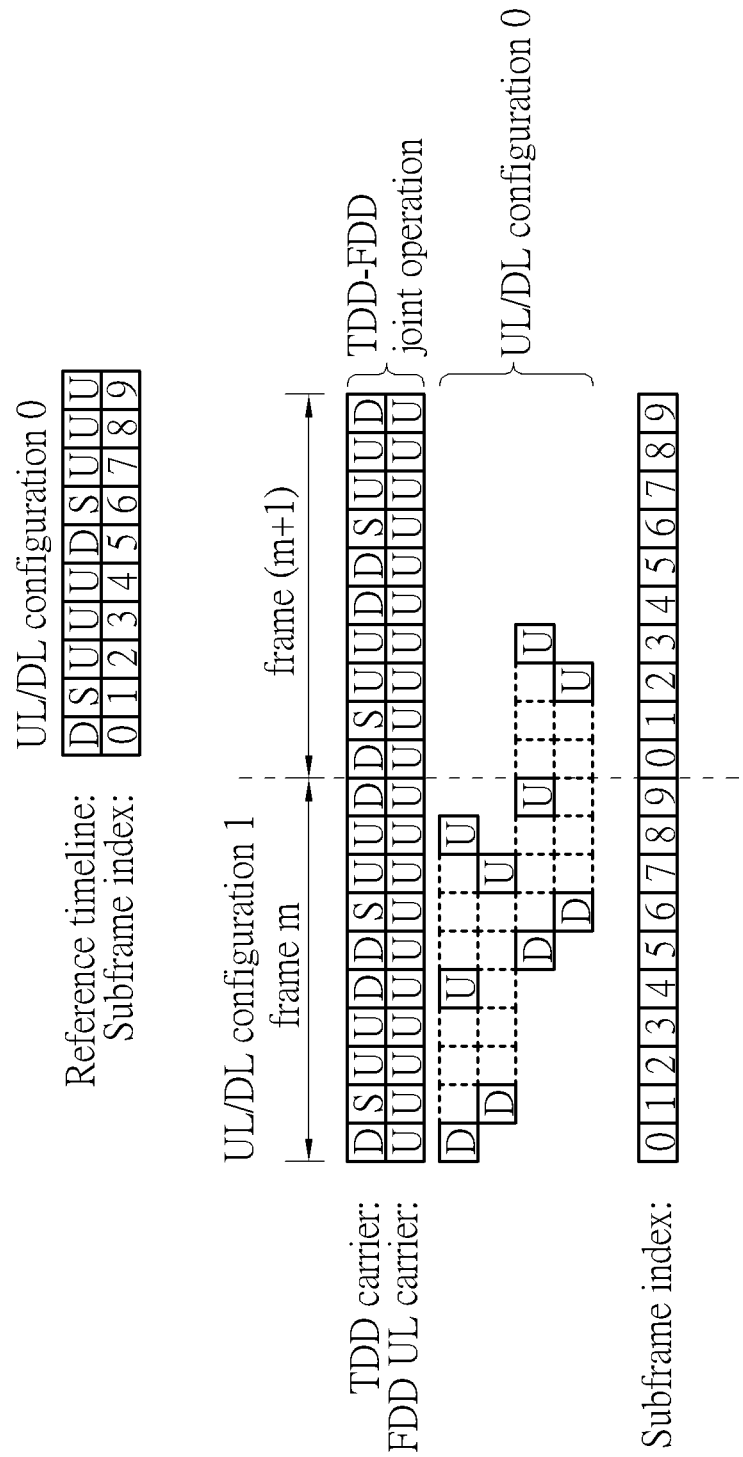

FIG. 8 is a schematic diagram of scheduling timeline for a UL grant according to an example of the present invention. A TDD carrier and a FDD UL carrier are shown in FIG. 8, wherein a UL/DL configuration of the TDD carrier is the UL/DL configuration 1. A reference UL/DL configuration which is the UL/DL configuration 0 is shown at the top of FIG. 8. The communication device performs a reception (e.g., of packet(s), message(s) or control information) according to a reference timeline which is a timeline of the UL/DL configuration 0. According to the previous description, the communication device may receive a UL grant in a first subframe of the TDD carrier with subframe index n (e.g., 0, 1, 5 and/or 6) from the network. Note that the subframes of the TDD carrier with subframe indices 2, 3, 7 and 8 are UL subframes according to a timeline of the UL/DL configuration 1, and receptions should not happen in the subframes. Then, the communication device may transmit at least one packet in a second subframe of the FDD UL carrier with subframe index k (e.g., 2, 3, 4, 7, 8 and/or 9) according to the timeline of the UL/DL configuration 0 to the network, to respond the UL grant. No transmission should happen in subframes of the FDD UL carrier with subframe indices 0, 1, 5 and 6, because these subframes are not corresponding to UL subframes according to the timeline of the UL/DL configuration 0. For example, the communication device may transmit packets in subframes of frame m of the FDD UL carrier with subframe indices 4 and/or 8, to respond the UL grant received in a subframe of frame m of the TDD carrier with subframe index 0. In other words, a rule for responding a UL grant in the TDD system is utilized in the present example, to handle the communication operation.

Figure 9:
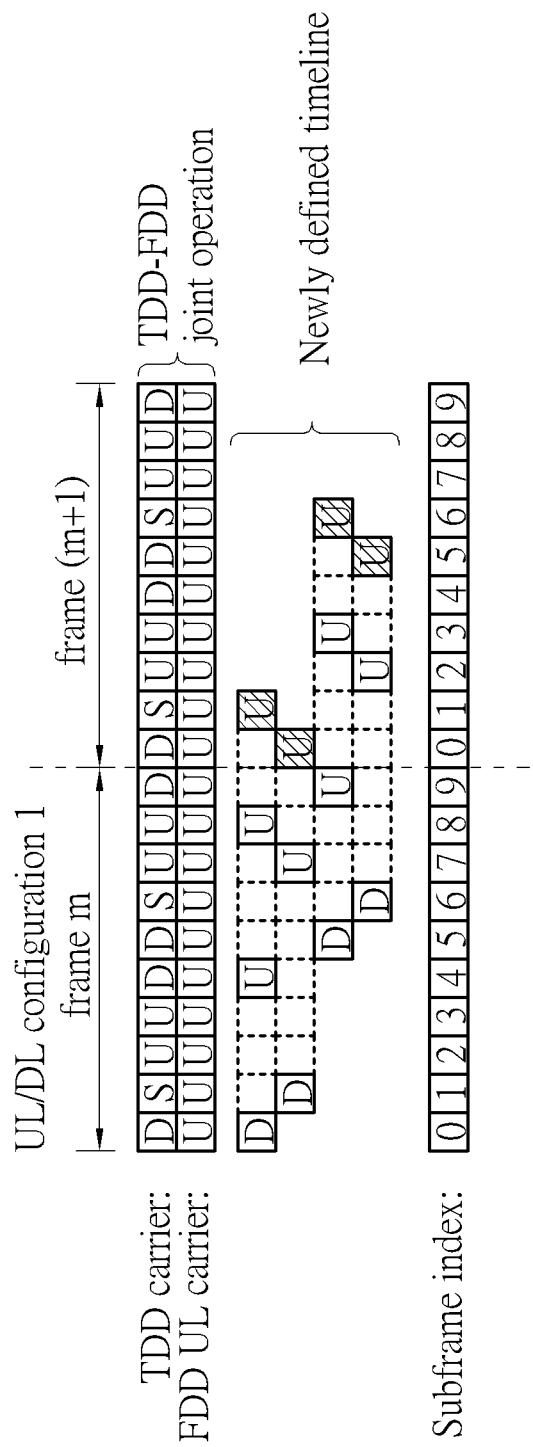

FIG. 9 is a schematic diagram of scheduling timeline for a UL grant according to an example of the present invention. A TDD carrier and a FDD UL carrier are shown in FIG. 9, wherein a UL/DL configuration of the TDD carrier is the UL/DL configuration 1. A reference timeline which may be a newly defined timeline is used for performing transmission(s). For example, the newly defined timeline may be modified according to the timeline of the UL/DL configuration 0 in FIG. 8 by adding UL subframes uniformly. That is, numbers of the UL subframes in rows of the timeline in FIG. 9 are nearly the same or exactly the same. The communication device performs a reception (e.g., of packet(s), message(s) or control information) according to the newly defined timeline. According to the previous description, the communication device may receive a UL grant in a first subframe of the TDD carrier with subframe index n (e.g., 0, 1, 5 and/or 6) from the network. Note that the subframes with subframe indices 2, 3, 7 and 8 are UL subframes according to the UL/DL configuration 1, and receptions should not happen in the subframes. Then, the communication device may transmit at least one packet in a second subframe of the FDD UL carrier with subframe index k (e.g., 0, 1, . . . , 8 and/or 9) according to the newly defined timeline to the network, to respond the UL grant. For example, the communication device may transmit packets in subframes of frames m and/or (m+1) of the FDD UL carrier with subframe indices 4, 8 and/or 1, to respond the UL grant received in a subframe of frame m of the TDD carrier with subframe index 0. Comparing examples in FIG. 8 and FIG. 9, all subframes of the FDD UL carrier may be used for performing transmission(s) in the present example. Thus, more flexibility is provided by using a newly defined timeline. In other words, a rule for responding a UL grant in the TDD system is utilized in the present example, to handle the communication operation.

Figure 10:
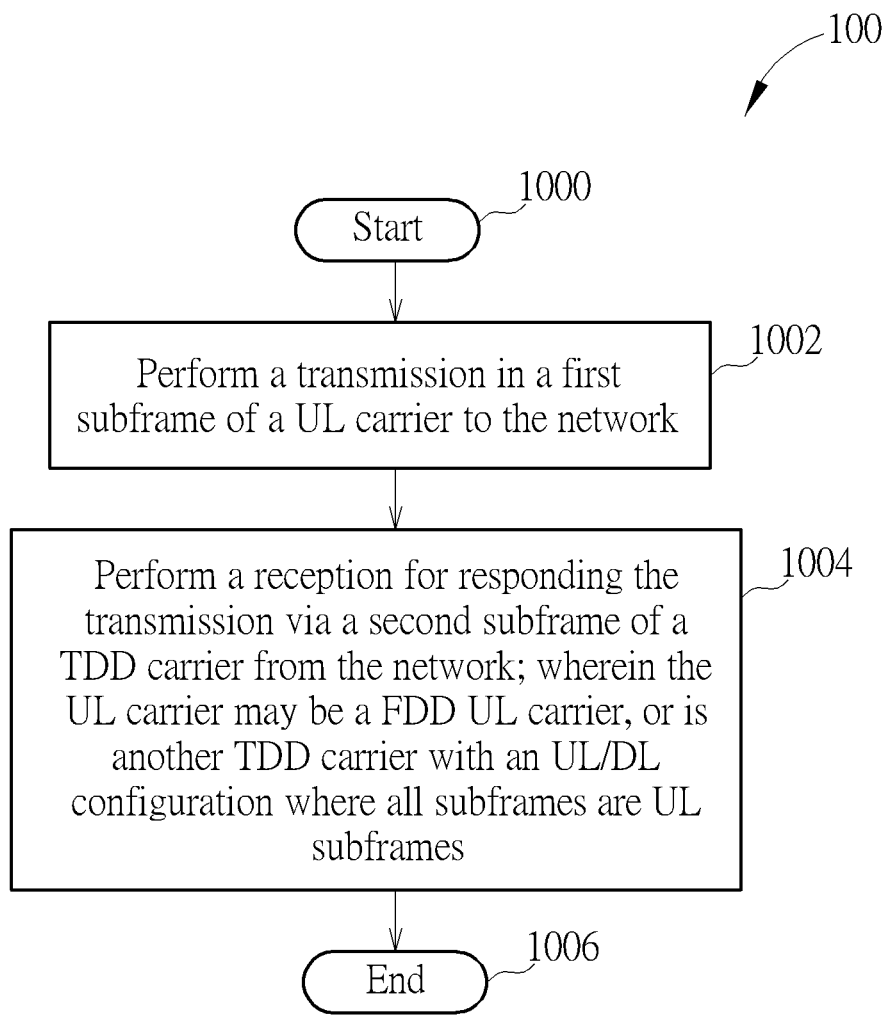
FIG. 10 is a flowchart of a process according to an example of the present invention.

FIG. 10 is a flowchart of a process 100 according to an example of the present invention. The process 100 may be utilized in a communication device shown in FIG. 2, for handling a communication operation. The process 100 may be compiled into the program code 314 and includes the following steps:

Step 1000: Start.

Step 1002: Perform a transmission in a first subframe of a UL carrier to the network.

Step 1004: Perform a reception for responding the transmission via a second subframe of a TDD carrier from the network; wherein the UL carrier may be a FDD UL carrier, or is another TDD carrier with an UL/DL configuration where all subframes are UL subframes.

Step 1006: End.

According to the process 100, the communication device performs a transmission in a first subframe of a UL carrier to the network, and performs a reception for responding the transmission via a second subframe of a TDD carrier from the network. The UL carrier may be a FDD UL carrier, or may be another TDD carrier with an UL/DL configuration where all subframes are UL subframes. That is, the transmission and the reception may be performed in different types of carriers. Note that the first subframe may be in a first frame, and the second subframe may be in a second frame. The first frame and the second frame may be the same frame or different frames, and may be determined according to the same rule used for determined the first subframe and the second subframe. In addition, subframe indices of the first subframe and the second subframe may be the same, if the first subframe and the second subframe are in different frames. In the process 100, the TDD carrier may be a primary carrier (e.g., primary component carrier, primary cell), and the UL carrier may be a secondary carrier (e.g., secondary component carrier, secondary cell).

In one example, the TDD carrier may be another FDD (e.g., UL or DL) carrier. In another example, the TDD carrier may be another FDD (e.g., UL or DL) carrier configured with a TDD UL/DL configuration. For example, the transmission may include at least one packet, and the reception may include a HARQ feedback for responding the at least one packet in the transmission. In another example, the communication device may determine that the HARQ feedback is a positive acknowledgement (ACK), if the HARQ feedback is not received successfully due to that the second subframe is not valid for performing the reception. If the HARQ feedback is actually a negative acknowledgement (NACK), a retransmission may be performed via a higher layer (e.g., radio link control (RLC) layer).

A method according to which the second subframe in the process 100 is determined is not limited. For example, the second subframe may be a (e.g., predetermined) number of subframes after the first subframe, and the number of subframes may be a constant regardless of a subframe index of the first subframe. That is, subframe indices of the first subframe and the second subframe may be n and (n+k), respectively, wherein n and k are positive integers. Taking FDD rule as an example, k is 4 regardless of the subframe index. In another example, the second subframe may be determined according to a timeline. The timeline may be determined according to a UL/DL configuration of the TDD carrier, or may be determined according to a UL/DL configuration configured by a higher layer signaling (e.g., RRC signaling). In another example, the timeline may be a newly defined timeline (e.g., modified from a timeline of the UL/DL configuration of the TDD carrier). The reception may be performed via a physical HARQ indicator channel (PHICH) of the second subframe of the TDD carrier. The transmission may be performed via a PUSCH of the first subframe of the UL carrier.

Thus, the communication operation (e.g., TDD-FDD joint operation) can be realized by the communication device according to the above description. Bandwidth efficiency and flexibility of the wireless communication system can be improved.

It should be noted that A FDD UL carrier is used for illustrating the following examples. However, as stated previously, similar examples can be obtained by replacing the FDD UL carrier by a TDD carrier with an UL/DL configuration where all subframes are UL subframes.

Figure 11:
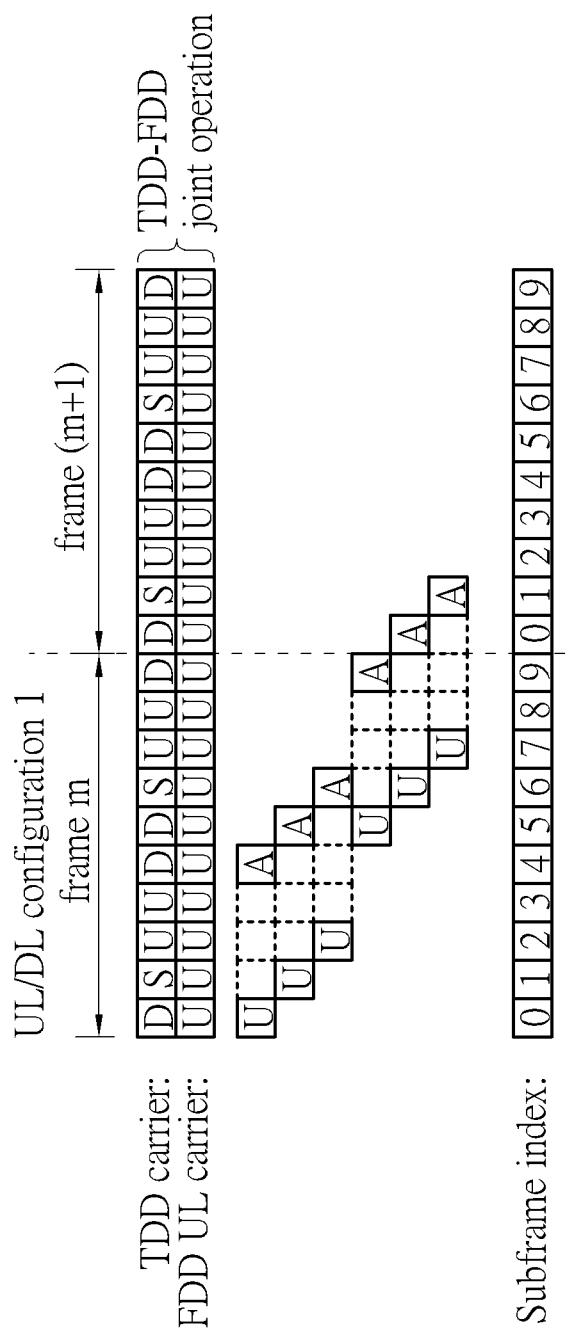
FIGS. 11-14 are schematic diagrams of HARQ-feedback timelines for HARQ feedback(s) according to examples of the present invention.

FIG. 11 is a schematic diagram of HARQ-feedback timeline for HARQ feedback(s) according to an example of the present invention. A TDD carrier and a FDD UL carrier are shown in FIG. 11, wherein a UL/DL configuration of the TDD carrier is the UL/DL configuration 1. The communication device performs a transmission (e.g., of packet(s), message(s) or control information) via the FDD UL carrier. According to the previous description, the communication device may transmit one or more packets in a first subframe of the FDD UL carrier with subframe index n (e.g., 0, 1, . . . , 8 and/or 9) to the network. Then, the communication device may receive a HARQ feedback in a second subframe of the TDD carrier with a subframe index (n+4) (e.g., 0, 1, 4, 5, 6 and/or 9) from the network regardless of the subframe index of the first subframe, and the HARQ feedback is for responding (i.e., acknowledging) the transmission. Note that the subframes with subframe indices 2, 3, 7 and 8 are UL subframes according to a timeline of the UL/DL configuration 1, and the communication device may not be able to perform the reception in the subframes. That is, the transmissions performed subframes with subframe indices 3, 4, 8 and 9 of the FDD UL carrier may not be acknowledged. In this situation, the communication device may determine that the HARQ feedback is an ACK. If the HARQ feedback is actually an NACK, a retransmission may be performed (e.g., triggered) via a higher layer (e.g., RLC layer). For example, the communication device may receive a HARQ feedback in a subframe of frame m of the TDD carrier with a subframe index 6, and the HARQ feedback is for responding the transmission occurred in a subframe of frame m of the FDD UL carrier with subframe index 2. In other words, a rule for responding a HARQ feedback in the FDD system is utilized in the present example, to handle the communication operation.

Figure 12:
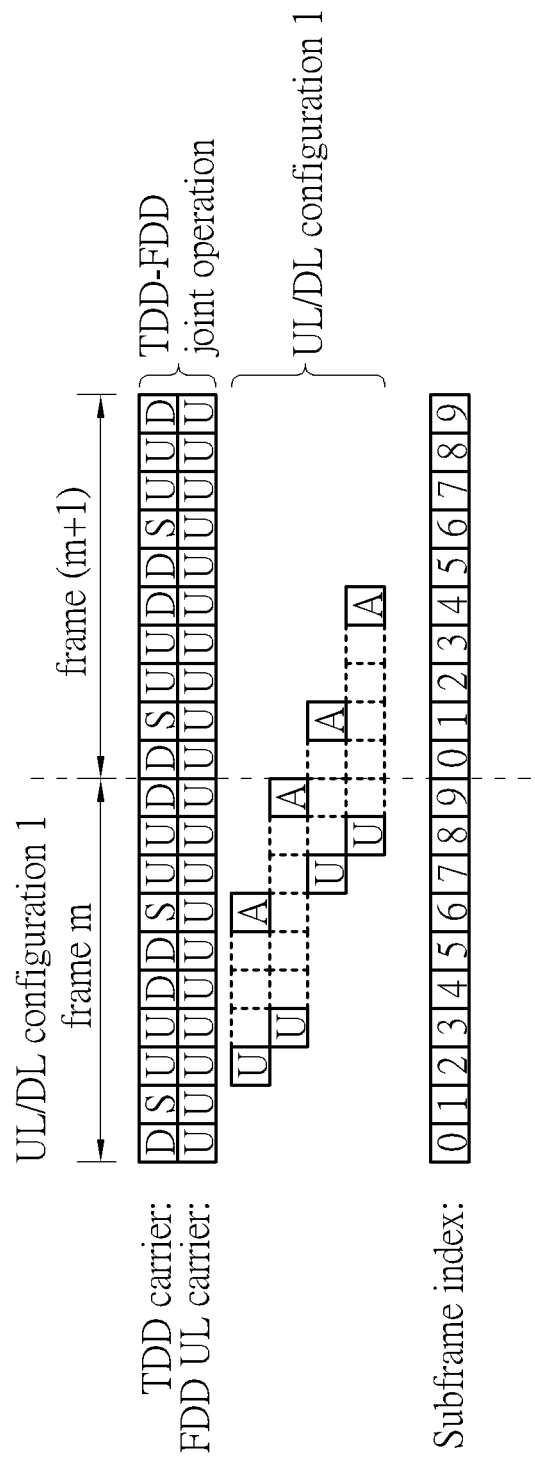

FIG. 12 is a schematic diagram of HARQ-feedback timeline for HARQ feedback (s) according to an example of the present invention. A TDD carrier and a FDD UL carrier are shown in FIG. 12, wherein a UL/DL configuration of the TDD carrier is the UL/DL configuration 1. The communication device performs a transmission (e.g., of packet (s), message (s) or control information) via the FDD UL carrier. According to the previous description, the communication device may transmit one or more packets in a first subframe of the FDD UL carrier with subframe index n (e.g., 0, 1, . . . , 8 and/or 9) to the network. Then, the communication device may receive a HARQ feedback in a second subframe of the TDD carrier with subframe index n (e.g., 1, 4, 6 and/or 9) according to a reference timeline which is a timeline of the UL/DL configuration 1 from the network, and the HARQ feedback is for responding (i.e., acknowledging) the transmission. Note that the subframes with subframe indices 0, 1, 4-6 and 9 are DL subframes according to the timeline of the UL/DL configuration 1, and the communication device may not be able to perform the transmission in the subframes of the TDD carrier. That is, the transmissions performed in subframes with subframe indices 0, 1, 4-6 and 9 of the FDD UL carrier may not be acknowledged. In this situation, the communication device may determine that the HARQ feedback is an ACK. If the HARQ feedback is actually an NACK, a retransmission may be performed (e.g., triggered) via a higher layer (e.g., RLC layer). For example, the communication device may receive a HARQ feedback in a subframe of frame m of the TDD carrier with a subframe index 9, and the HARQ feedback is for responding the transmission occurred in a subframe of frame m of the FDD UL carrier with subframe index 3. In other words, a rule for responding a HARQ feedback in the TDD system is utilized in the present example, to handle the communication operation.

Figure 13:
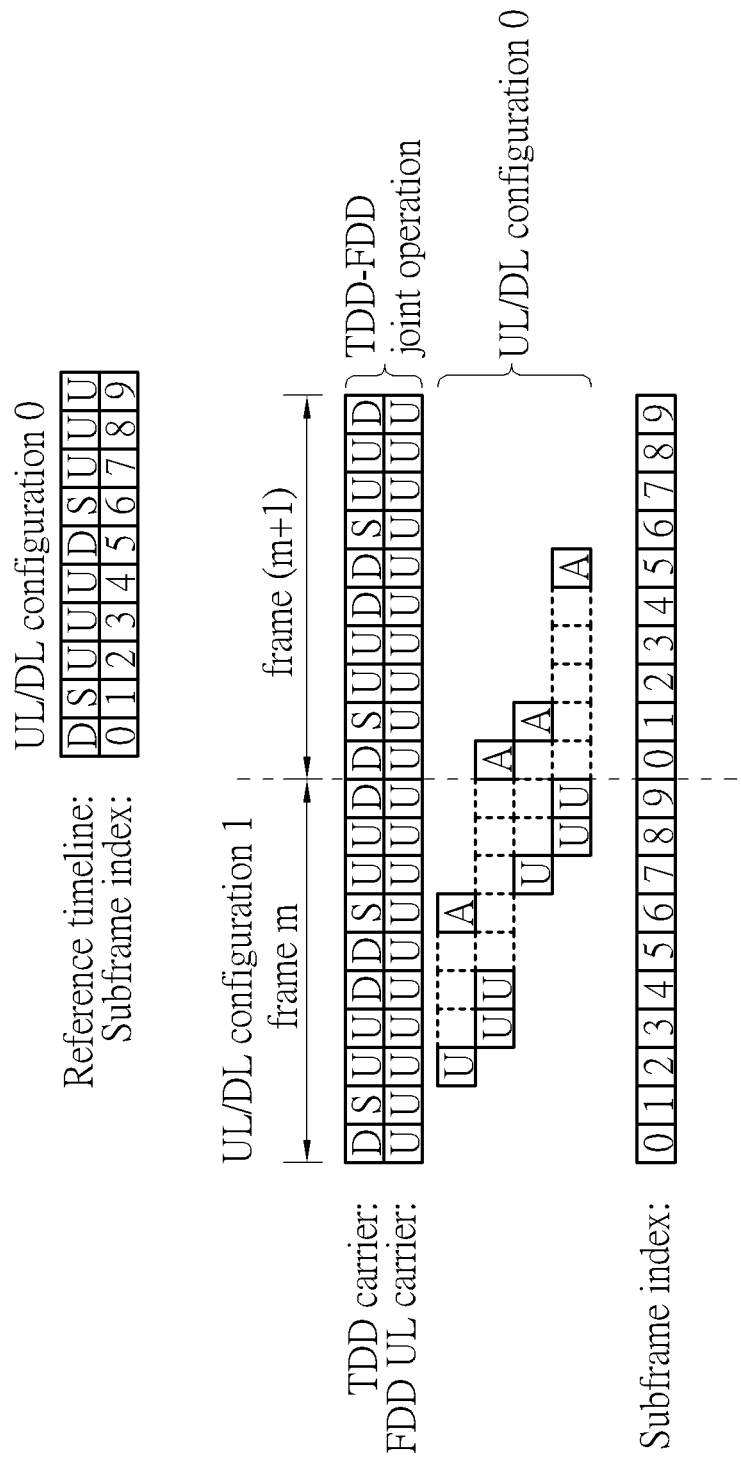

FIG. 13 is a schematic diagram of HARQ-feedback timeline for HARQ feedback (s) according to an example of the present invention. A TDD carrier and a FDD UL carrier are shown in FIG. 13, wherein a UL/DL configuration of the TDD carrier is the UL/DL configuration 1. A reference timeline which is a timeline of the UL/DL configuration 0 is shown at the top of FIG. 13. The communication device performs a transmission (e.g., of packet (s), message (s) or control information) via the FDD UL carrier. According to the previous description, the communication device may transmit one or more packets in a first subframe of the FDD UL carrier with subframe index n (e.g., 0, 1, ..., 8 and/or 9) to the network. Then, the communication device may receive a HARQ feedback in a second subframe of the TDD carrier with subframe index n (e.g., 0, 1, 5 or 6) according to a timeline of the UL/DL configuration 0 from the network, and the HARQ feedback is for responding (i.e., acknowledging) the transmission. Note that the subframes with subframe indices 0, 1 and 5-6 are DL subframes according to the timeline of the UL/DL configuration 0, and the communication device may not be able to perform the transmission in the subframes of the TDD carrier. That is, the transmissions performed in subframes with subframe indices 0, 1 and 5-6 of the FDD UL carrier may not be acknowledged. In this situation, the communication device may determine that the HARQ feedback is an ACK. If the HARQ feedback is actually an NACK, a retransmission may be performed (e.g., triggered) via a higher layer (e.g., RLC layer). For example, the communication device may receive a HARQ feedback in a subframe of frame (m+1) of the TDD carrier with a subframe index 0, and the HARQ feedback is for responding the transmissions occurred in subframes of frame m of the FDD UL carrier with subframe indices 3 and/or 4. In other words, a rule for responding a HARQ feedback in the TDD system is utilized in the present example, to handle the communication operation.

Figure 14:
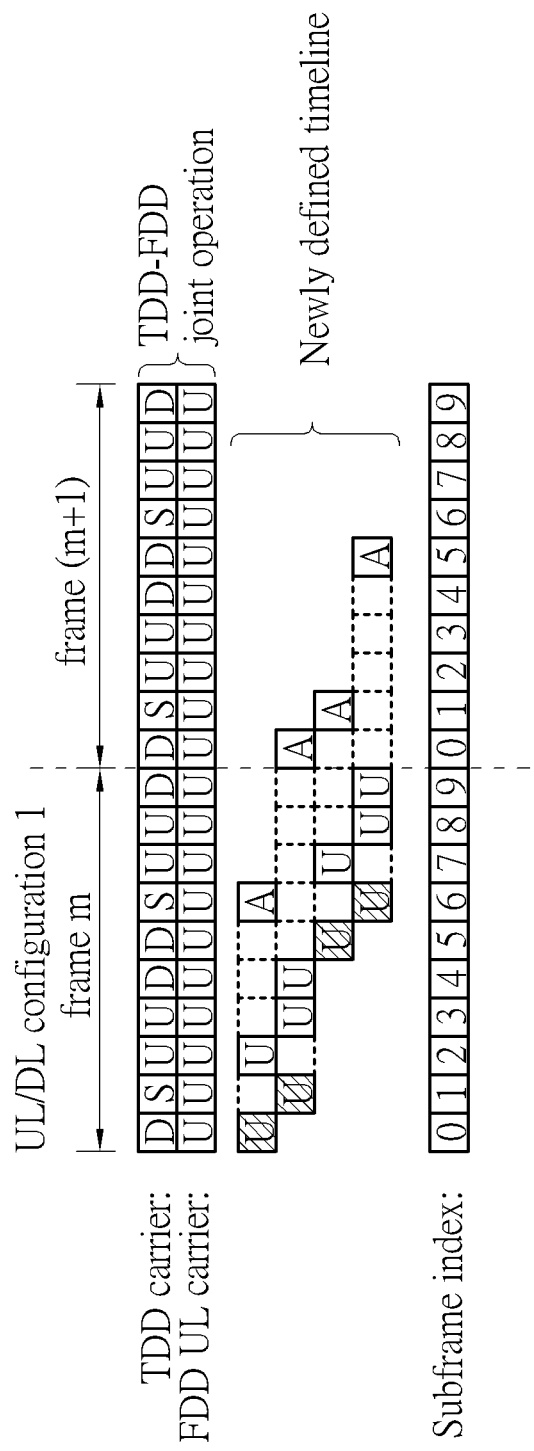

FIG. 14 is a schematic diagram of HARQ-feedback timeline for HARQ feedback(s) according to an example of the present invention. A TDD carrier and a FDD UL carrier are shown in FIG. 14, wherein a UL/DL configuration of the TDD carrier is the UL/DL configuration 1. A reference timeline which may be a newly defined timeline is used for performing reception(s). For example, the newly defined timeline may be modified according to the timeline of the UL/DL configuration 0 in FIG. 13 by adding UL subframes uniformly. That is, numbers of the UL subframes in rows of the timeline in FIG. 14 are nearly the same or exactly the same. The communication device performs a transmission (e.g., of packet (s), message(s) or control information) according to the UL/DL configuration 1. According to the previous description, the communication device may transmit one or more packets in a first subframe of the FDD UL carrier with subframe index n (e.g., 0, 1, ..., 8 and/or 9) to the network. Then, the communication device may receive a HARQ feedback in a second subframe of the TDD carrier with subframe index n (e.g., 0, 1, 5 and/or 6) according to the newly defined timeline from the network, and the HARQ feedback is for responding (i.e., acknowledging) the transmission. Comparing with the previous example, the transmission (s) performed in subframes with subframe indices 0, 1 and/or 5-6 of the FDD UL carrier may also be acknowledged according to the newly defined timeline. For example, the communication device may receive a HARQ feedback in a subframe of frame (m+1) of the TDD carrier with a subframe index 0, and the HARQ feedback is for responding the transmissions occurred in subframes of frame m of the FDD UL carrier with subframe indices 1, 3 and/or 4. In other words, a rule for responding a HARQ feedback in the TDD system is utilized in the present example, to handle the communication operation.

Operation of a HARQ process is first briefly discussed as follows, to ease the illustration of the following examples of the present invention. The HARQ process is used in the LTE system to provide both efficient and reliable communications. Different from an ARQ process, a forward correcting code (FEC) is used for realizing the HARQ process. For example, a receiver feeds back an ACK to inform a transmitter that a packet has been received correctly, if the receiver decodes the packet correctly. Oppositely, the receiver feeds back an NACK to the transmitter, if the receiver cannot decode the packet correctly. In this situation, the receiver stores part or the whole of the packet in a soft buffer of the receiver. After the receiver receives a retransmitted packet from the transmitter, soft values of the retransmitted packet and the stored packet are combined. The receiver decodes the packet by using the combined soft values. The combination of the previously erroneously received packet (s) and the currently received packet increases a probability of successful decoding. The receiver continues the HARQ process until the packet is decoded correctly, or until a maximum number of retransmissions have been reached, at which time the HARQ process declares a failure, and the packet will be recovered via an ARQ process in a RLC layer. Thus, each packet corresponds to a HARQ process number which may be indicated by DCI, wherein the HARQ process number should be not greater than a maximum number of HARQ processes.

FIG. 15 is a table 104 of $M_{DL\_HARQ}$ according to an example of the invention. The results for the TDD system and the FDD system are shown in FIG. 15. As can be seen, the maximum number of HARQ processes (e.g., per carrier), $M_{DL\_HARQ}$ may be related to a duplex mode and/or a configuration operated by the communication device. For example, $M_{DL\_HARQ}$ is set to 8 for the FDD carrier. $M_{DL\_HARQ}$ are set to 4, 7, 10, 9, 12, 15 and 6 for the TDD carrier with UL/DL configuration 0, 1, 2, 3, 4, 5 and 6, respectively. Thus, 3 bits in DCI are needed for indicating up to 8 HARQ processes for the FDD carrier. For the TDD carrier, 4 bits in DCI are needed for indicating a various maximum number of HARQ processes according to UL/DL configurations, e.g., 4 bits in DCI are needed for indicating up to 15 HARQ processes.

It should be noted that, according to the FIG. 5, the communication device may receive one or more packets in a subframe of a TDD carrier with subframe index n from the network, and transmit a corresponding HARQ feedback in a subframe of a FDD UL carrier with subframe index (n+4) to the network regardless of the subframe index n. In other words, for the TDD carrier, a rule for responding a HARQ feedback in the FDD system is utilized in the present example, to handle the communication operation (e.g., TDD-FDD joint operation). In this situation, the maximum number of HARQ processes of the TDD carrier needs to be modified when the TDD carrier is jointly operated with the FDD UL carrier.

Figure 16:
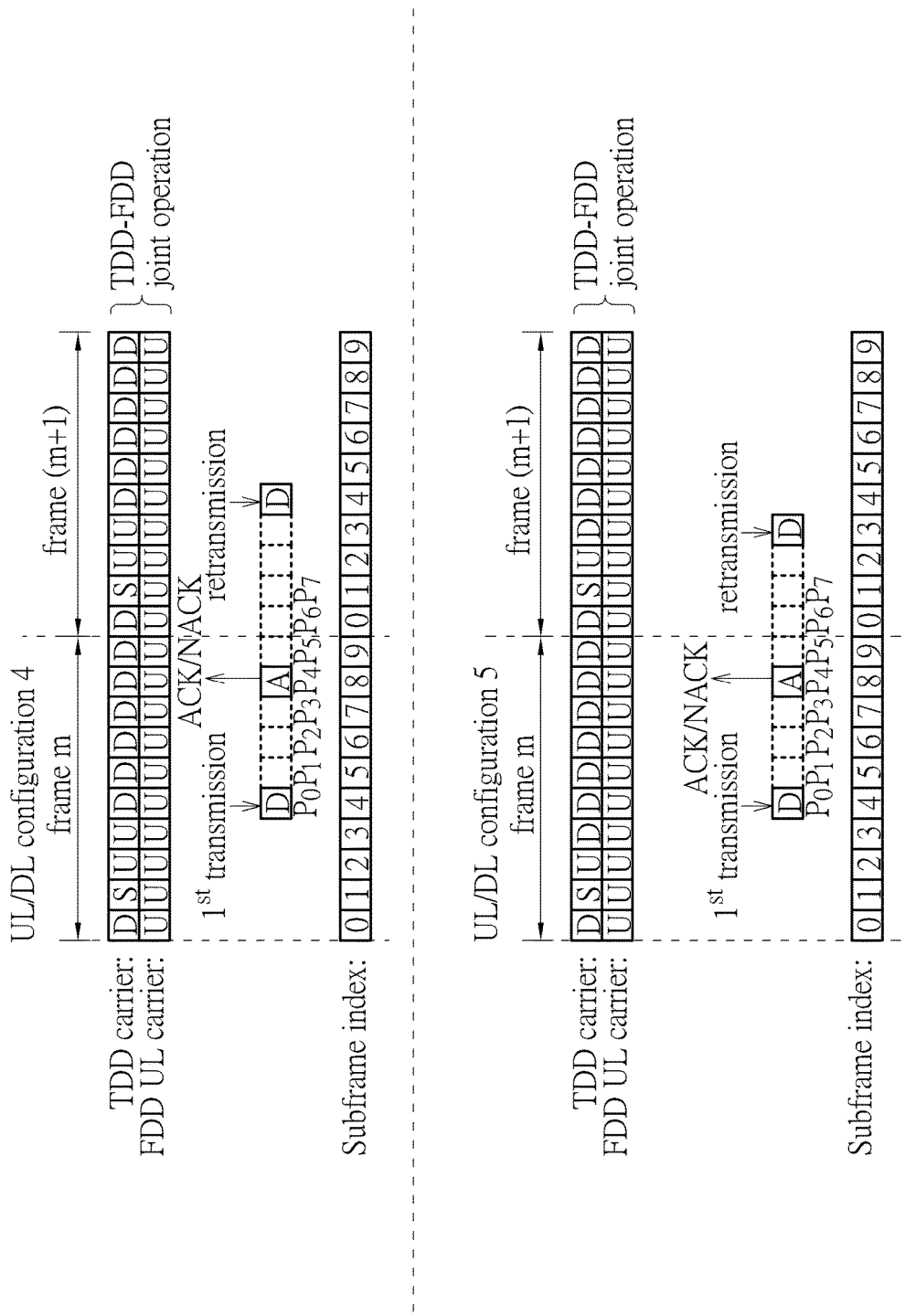
FIG. 16 is a schematic diagram of the number of HARQ processes according to an example of the present invention.

FIG. 16 is a schematic diagram of the number of HARQ processes according to an example of the present invention. As shown in FIG. 16, the communication device communicates with the network via a TDD carrier and a FDD UL carrier. Taking the UL/DL configuration 4 as an example, the first transmission from the network (i.e., reception for the communication device) may occur in a subframe of frame m of the TDD carrier with subframe index 4. Then, the communication device may transmit a HARQ feedback for responding the first transmission in the subframe of frame m of the UL carrier with subframe index 8. The network may perform a retransmission, if the HARQ feedback is an NACK. The retransmission from the network may occur in a subframe of frame (m+1) of the TDD carrier with subframe index 4, because the (n+4)th subframe of the TDD carrier after the transmission of the HARQ feedback is not a DL subframe until the subframe of frame (m+1) of the TDD carrier with subframe index 4. At most 8 HARQ processes $p_0$-$p_7$ may happen between the first transmission and the retransmission, as shown at the top of FIG. 16, because the number of DL subframes of the TDD carrier therebetween is 8. Thus, when the FDD UL carrier is jointly operated with the TDD carrier and the TDD carrier is configured with the UL/DL configuration 4, the maximum number of HARQ processes, $M_{DL\_HARQ}$, for the TDD carrier is 8. Similarly, when the FDD UL carrier is jointly operated with the TDD carrier and the TDD carrier is configured with the UL/DL configuration 5, $M_{DL\_HARQ}$ for the TDD carrier is 8, because at most 8 HARQ processes $p_0$-$p_7$ may happen between the first transmission and the retransmission, as shown at the bottom of FIG. 16.

According to the above description, especially the process 40 and the description related to the computation of $M_{DL\_HARQ}$, $M_{DL\_HARQ}$ for UL/DL configuration 0-6 can be obtained according to the present invention.

FIG. 17 is a table 106 of $M_{DL\_HARQ}$ according to an example of the invention. The results for the system operating the TDD-FDD joint operation are shown in FIG. 17. It should be noted that $M_{DL\_HARQ}$ in the table 106 determined according to the present invention is at least equal or smaller than $M_{DL\_HARQ}$ in the table 104 determined according to the prior art. Thus, blocking probability of HARQ processes can be reduced according to the present invention, because a size of a soft buffer for storing the HARQ processes is increased because of smaller $M_{DL\_HARQ}$.

Figure 18:
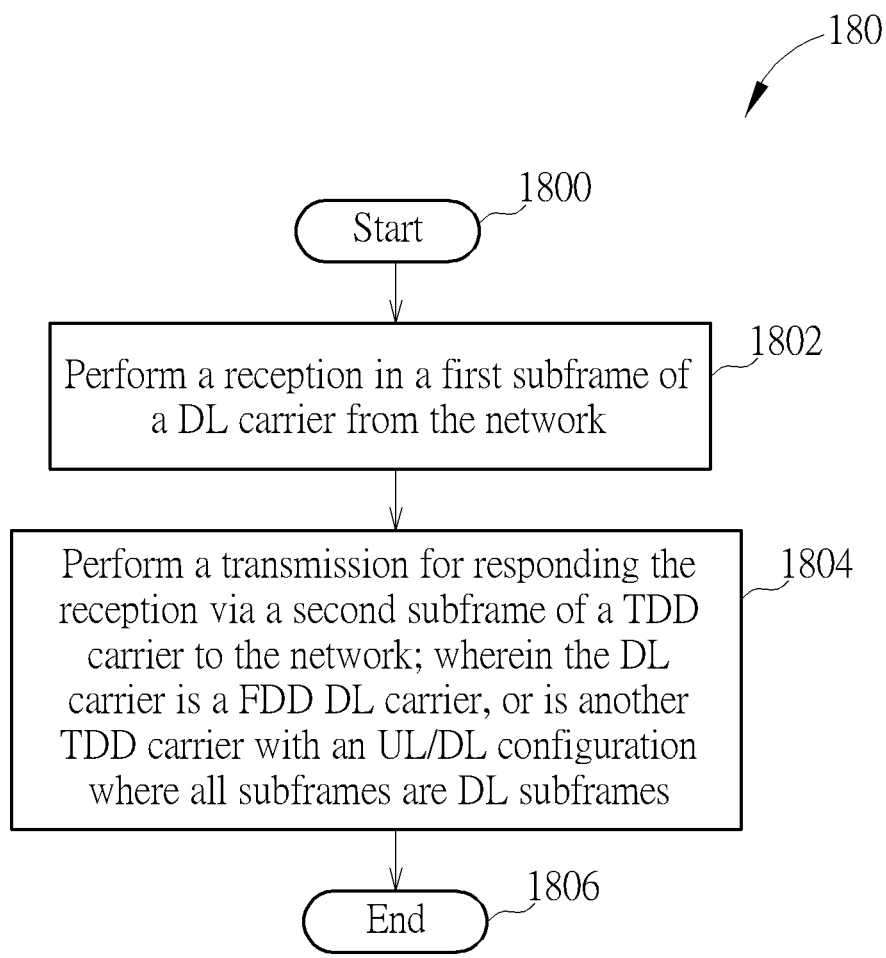
FIG. 18 is a flowchart of a process according to an example of the present invention.

FIG. 18 is a flowchart of a process 180 according to an example of the present invention. The process 180 may be utilized in a communication device shown in FIG. 2, for handling a communication operation. The process 180 may be compiled into the program code 314 and includes the following steps:

Step 1800: Start.

Step 1802: Perform a reception in a first subframe of a DL carrier from the network.

Step 1804: Perform a transmission for responding the reception via a second subframe of a TDD carrier to the network; wherein the DL carrier is a FDD DL carrier, or is another TDD carrier with an UL/DL configuration where all subframes are DL subframes.

Step 1806: End.

According to the process 180, the communication device performs a reception in a first subframe of a DL carrier from the network, and performs a transmission for responding the reception via a second subframe of a TDD carrier to the network; wherein the DL carrier may be a FDD DL carrier, or is another TDD carrier with an UL/DL configuration where all subframes are DL subframes. That is, the transmission and the reception may be performed in different types of carriers. Note that the first subframe may be in a first frame, and the second subframe may be in a second frame. The first frame and the second frame may be the same frame or different frames, and may be determined according to the same rule used for determined the first subframe and the second subframe. In addition, subframe indices of the first subframe and the second subframe may be the same, if the first subframe and the second subframe are in different frames. In the process 180, the TDD carrier may be a primary carrier (e.g., primary component carrier, primary cell), and the DL carrier may be a secondary carrier (e.g., secondary component carrier, secondary cell).

In one example, the TDD carrier may be another FDD (e.g., UL or DL) carrier. In another example, the TDD carrier may be another FDD (e.g., UL or DL) carrier configured with a TDD UL/DL configuration. For example, the reception may include at least one packet, and the transmission may include a HARQ feedback for responding the at least one packet in the reception. In this situation, a HARQ process number of the HARQ feedback should be not greater than a maximum number of HARQ processes, $M_{DL\_HARQ}$ determined according to the reception and the transmission. In another example, the reception may include a UL grant, and the transmission is performed according to the UL grant. For example, $M_{DL\_HARQ}$ for a UL/DL configuration 0 may be 10, $M_{DL\_HARQ}$ for a UL/DL configuration 1 may be 11, $M_{DL\_HARQ}$ for a UL/DL configuration 2 may be 12, $M_{DL\_HARQ}$ for a UL/DL configuration 3 may be 15, and/or $M_{DL\_HARQ}$ for a UL/DL configuration 4 may be 16. In addition, $M_{DL\_HARQ}$ for a UL/DL configuration 5 may be 16, and/or $M_{DL\_HARQ}$ for a UL/DL configuration 6 may be 11. In addition, the network may determine that the HARQ feedback is an ACK, if the HARQ feedback is not transmitted successfully due to that the second subframe of the TDD carrier is not valid for performing the transmission. If the HARQ feedback is actually an NACK, a retransmission may be performed via a higher layer (e.g., RLC layer).

A method according to which the second subframe in the process 180 is determined is not limited. For example, the second subframe may be a (e.g., predetermined) number of subframes after the first subframe, and the number of subframes may be a constant regardless of a subframe index of the first subframe. That is, subframe indices of the first subframe and the second subframe may be n and (n+k), respectively, wherein n and k are positive integers. Taking FDD rule as an example, k is 4 regardless of the subframe index of the first subframe. In another example, the second subframe may be determined according to a reference timeline. The reference timeline may be determined according to a UL/DL configuration of the TDD carrier, or may be determined according to a UL/DL configuration configured by a higher layer signaling (e.g., RRC signaling). In another example, the reference timeline may be a newly defined timeline (e.g., modified from a timeline of the UL/DL configuration of the TDD carrier). The reception may be performed via a PDSCH of the first subframe of the DL carrier or via a PDCCH of the first subframe of the DL carrier. The transmission may be performed via a PUSCH of the second subframe of the TDD carrier or via a PUCCH of the second subframe of the TDD carrier.

Thus, the communication operation (e.g., TDD-FDD joint operation) can be realized by the communication device according to the above description. Bandwidth efficiency and flexibility of the wireless communication system can be improved.

It should be noted that A FDD DL carrier is used for illustrating the following examples. However, as stated previously, similar examples can be obtained by replacing the FDD DL carrier by a TDD carrier with an UL/DL configuration where all subframes are DL subframes.

Figure 19:
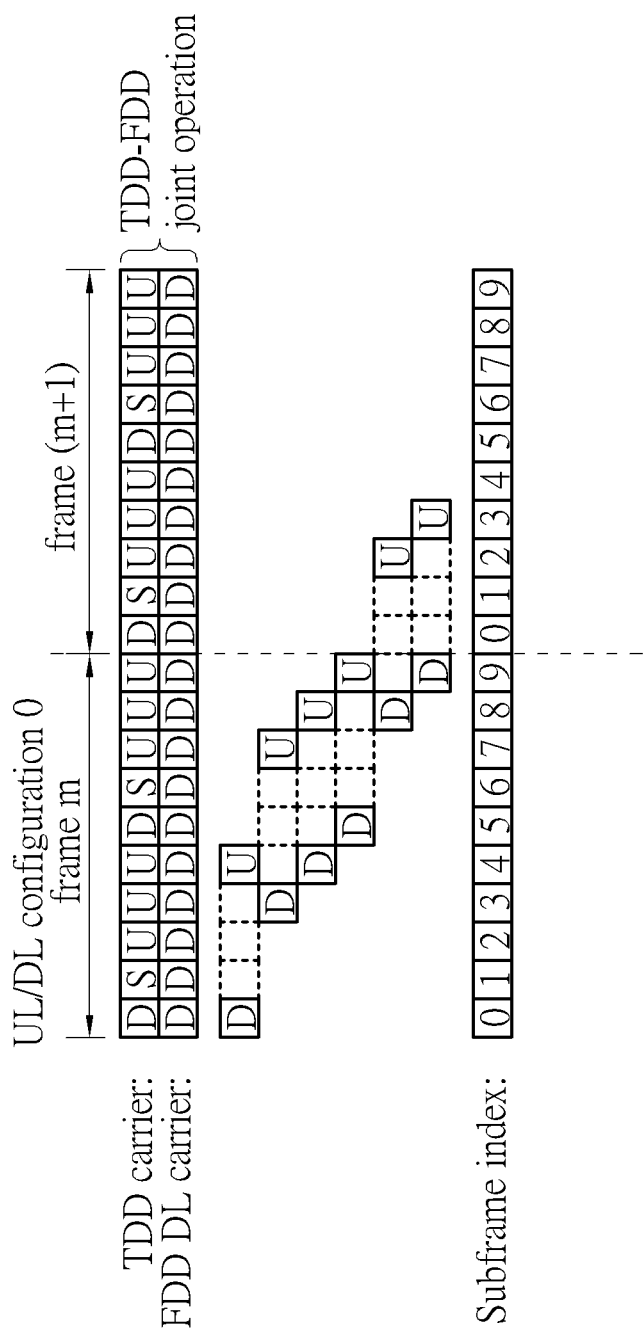
FIG. 19 is a schematic diagram of scheduling timeline for a UL grant according to an example of the present invention.

FIG. 19 is a schematic diagram of scheduling timeline for a UL grant according to an example of the present invention. A TDD carrier and a FDD DL carrier are shown in FIG. 19, wherein a UL/DL configuration of the TDD carrier is the UL/DL configuration 0. The communication device performs a reception (e.g., of packet(s), message(s) or control information) via the FDD DL carrier. According to the previous description, the communication device may receive a UL grant in a first subframe of the FDD DL carrier with subframe index n (e.g., 0, 3, 4, 5, 8 and/or 9) from the network. Note that the subframes with subframe indices 0, 1, 5 and 6 are DL subframes according to a timeline of the UL/DL configuration 0, and transmissions should not happen in the subframes of the TDD carrier. Then, the communication device may transmit a packet in a second subframe of the TDD carrier with a subframe index (n+4) to the network regardless of the subframe index of the first subframe, to respond the UL grant. For example, the communication device may transmit a packet in a subframe of frame m of the TDD carrier with a subframe index 7, to respond the UL grant received in a subframe of frame m of the FDD DL carrier with subframe index 3. In other words, a rule for responding a UL grant in the FDD system is utilized in the present example, to handle the communication operation.

Figure 20:
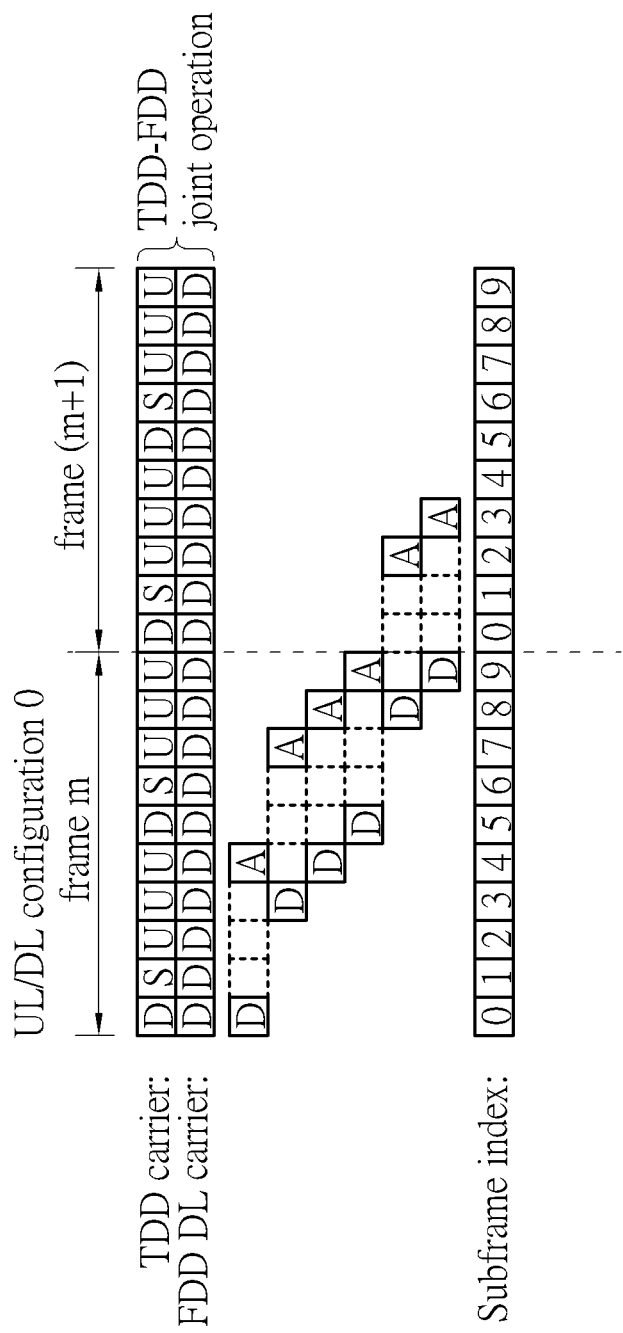
FIGS. 20-23 are schematic diagrams of HARQ-feedback timelines for HARQ feedback(s) according to examples of the present invention.

FIG. 20 is a schematic diagram of HARQ-feedback timeline for HARQ feedback(s) according to an example of the present invention. A TDD carrier and a FDD DL carrier are shown in FIG. 20, wherein a UL/DL configuration of the TDD carrier is the UL/DL configuration 0. The communication device performs a reception (e.g., of packet (s), message(s) or control information) via the FDD DL carrier. According to the previous description, the communication device may receive one or more packets in a first subframe of the FDD DL carrier with subframe index n (e.g., 0, 1, 2, ..., 8 and/or 9) from the network. Then, the communication device may transmit a HARQ feedback in a second subframe of the TDD carrier with a subframe index (n+4) (e.g., 2, 3, 4, 7, 8 and/or 9) to the network, to respond (i.e., acknowledge) the reception. Note that the subframe with subframe indices 0, 1, 5 and 6 are DL subframes according to the UL/DL configuration 0, and a transmission should not happen in the subframes of the TDD carrier. For example, the communication device may transmit a HARQ feedback in a subframe of frame m of the TDD carrier with a subframe index 7, to respond the reception occurred in a subframe of frame m of the FDD DL carrier with subframe index 3. In addition, the reception performed in subframes of the FDD DL carrier with subframe indices 1, 2 and 6-7 may not be acknowledged by the communication device. In this situation, the network may determine that the HARQ feedback is an ACK. If the HARQ feedback is actually an NACK, a retransmission may be performed (e.g., triggered) via a higher layer (e.g., RLC layer). In other words, a rule for responding a HARQ feedback in the FDD system is utilized in the present example, to handle the communication operation.

Figure 21:
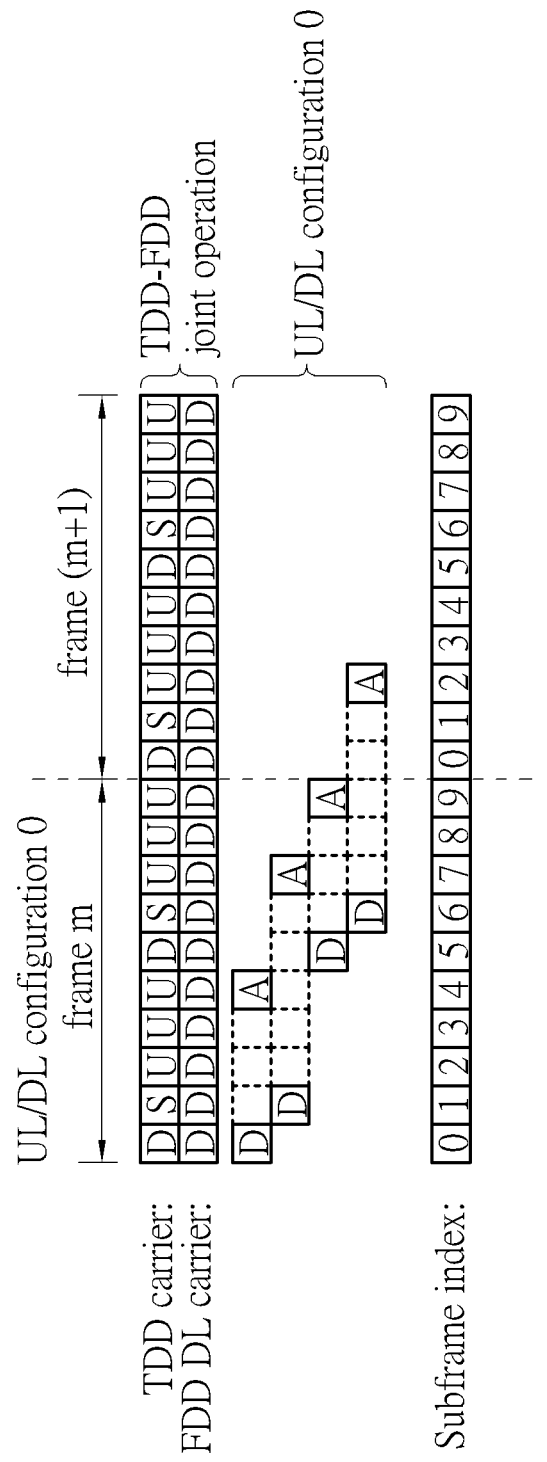

FIG. 21 is a schematic diagram of HARQ-feedback timeline for HARQ feedback(s) according to an example of the present invention. A TDD carrier and a FDD DL carrier are shown in FIG. 21, wherein a UL/DL configuration of the TDD carrier is the UL/DL configuration 0. The communication device performs a reception (e.g., of packet (s), message(s) or control information) via the FDD DL carrier. According to the previous description, the communication device may receive one or more packets in a first subframe of the FDD DL carrier with subframe index n (e.g., 0, 1, 2, ..., 8 and/or 9) from the network. Then, the communication device may transmit a HARQ feedback in a second subframe of the TDD carrier with a subframe index k (e.g., 2, 4, 7 and/or 9) according to a reference timeline which is a timeline of the UL/DL configuration 0 to the network, to respond (i.e., acknowledge) the reception. For example, the communication device may transmit a HARQ feedback in a subframe of frame (m+1) of the TDD carrier with a subframe index 2, to respond the reception occurred in a subframe of frame m of the FDD DL carrier with subframe index 6. Note that the subframes of the TDD carrier with subframe indices 2-4 and 7-9 are UL subframes according to a timeline of the UL/DL configuration 0, and a reception should not happen in the subframes of the TDD carrier. Accordingly, the reception performed in the subframes of the FDD DL carrier with subframe indices 2-4 and 7-9 may not be acknowledged by the communication device. In this situation, the network may determine that the HARQ feedback is an ACK. If the HARQ feedback is actually an NACK, a retransmission may be performed (e.g., triggered) via a higher layer (e.g., RLC layer). In other words, a rule for responding a HARQ feedback in the TDD system is utilized in the present example, to handle the communication operation.

Figure 22:
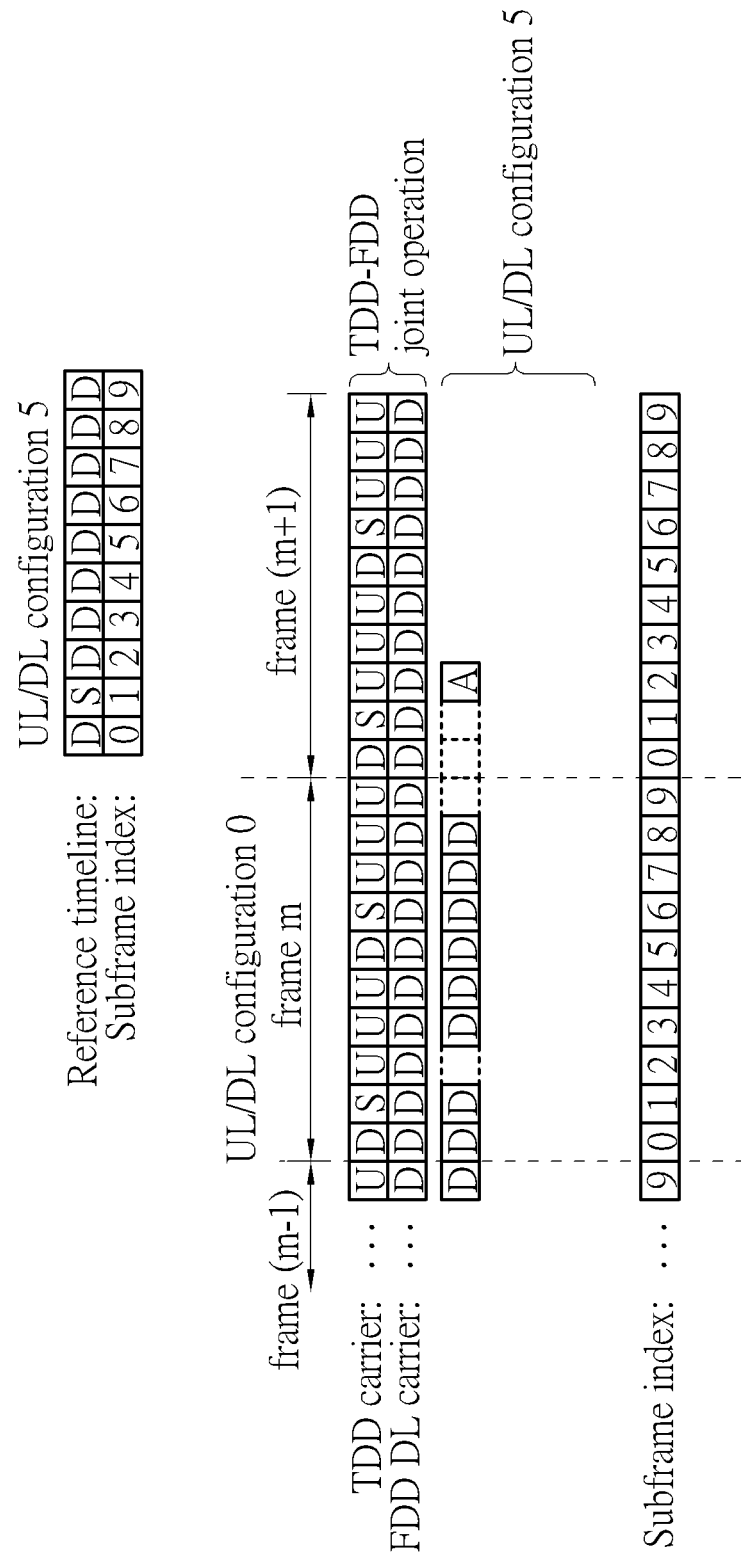

FIG. 22 is a schematic diagram of HARQ-feedback timeline for HARQ feedback (s) according to an example of the present invention. A TDD carrier and a FDD DL carrier are shown in FIG. 22, wherein a UL/DL configuration of the TDD carrier is the UL/DL configuration 0. A reference timeline which is a timeline of the UL/DL configuration 5 is shown at the top of FIG. 22. The communication device performs a reception (e.g., of packet (s), message (s) or control information) via the FDD DL carrier. According to the previous description, the communication device may receive one or more packets in a first subframe of the FDD DL carrier with subframe index n (e.g., 0, 1, 2, ..., 8 and/or 9) from the network. Then, the communication device may transmit a HARQ feedback in a second subframe of the TDD carrier with a subframe index k (e.g., 2) according to a timeline of the UL/DL configuration 5 to the network, to respond (i.e., acknowledge) the reception. For example, the communication device may transmit a HARQ feedback in a subframe of frame (m+1) of the TDD carrier with a subframe index 2, to respond the reception occurred in subframe of frame (m−1) of the TDD carrier with subframe index 9 and/or the reception occurred in subframe (s) of frame m of the FDD DL carrier with subframe indices 0, 1, 3, 4, 5, 6, 7 and/or 8. Note that the subframe of the TDD carrier with subframe index 2 is a UL subframe according to a timeline of the UL/DL configuration 5, and a reception should not happen in the subframes of the TDD carrier. Accordingly, the reception performed in the subframe of the FDD DL carrier with subframe index 2 may not be acknowledged by the communication device. In this situation, the network may determine that the HARQ feedback is an ACK. If the HARQ feedback is actually an NACK, a retransmission may be performed (e.g., triggered) via a higher layer (e.g., RLC layer). In other words, a rule for responding a HARQ feedback in the TDD system is utilized in the present example, to handle the communication operation.

Figure 23:
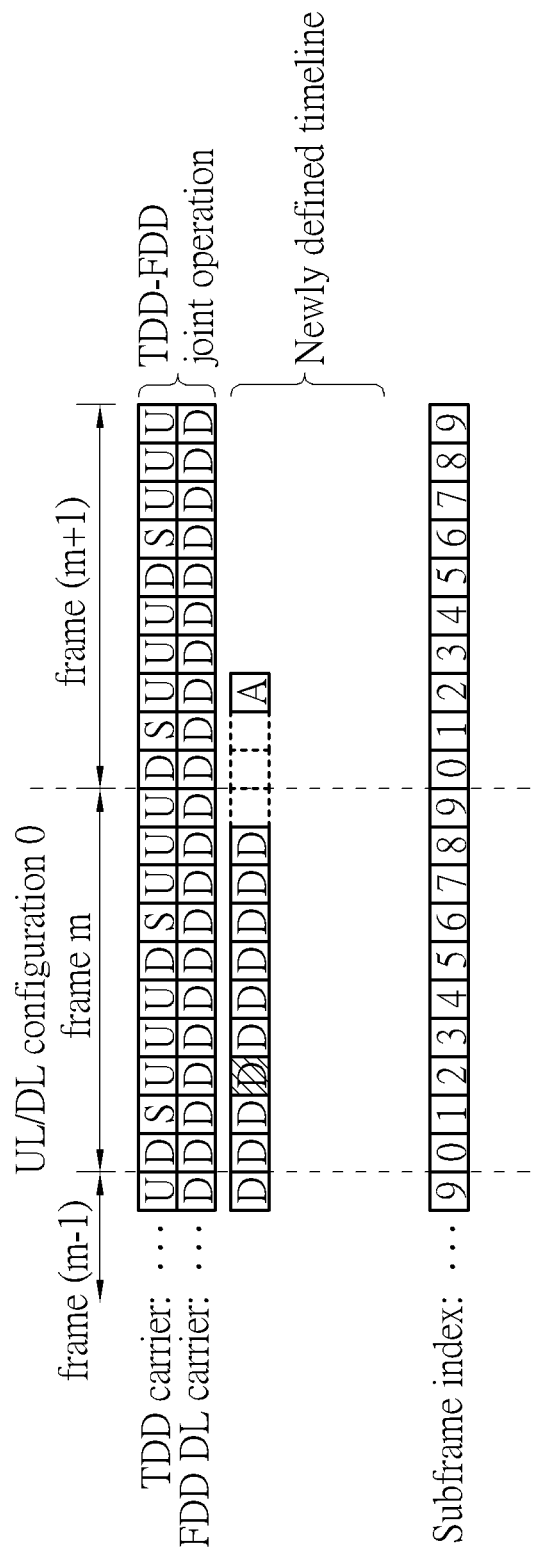

FIG. 23 is a schematic diagram of HARQ-feedback timeline for HARQ feedback(s) according to an example of the present invention. A TDD carrier and a FDD DL carrier are shown in FIG. 23, wherein a UL/DL configuration of the TDD carrier is the UL/DL configuration 0. A reference timeline timeline which is a newly defined timeline is used for performing transmission (s). For example, the newly defined timeline may be modified from a timeline of the UL/DL configuration 5 in FIG. 22 by adding a DL subframe. The communication device performs a reception (e.g., of packet(s), message(s) or control information) via the FDD DL carrier. According to the previous description, the communication device may receive one or more packets in a first subframe of the FDD DL carrier with subframe index n (e.g., 0, 1, 2, ..., 8 and/or 9) from the network. Then, the communication device may transmit a HARQ feedback in a second subframe of the TDD carrier with a subframe index k (e.g., 2) according to the newly defined timeline to the network, to respond (i.e., acknowledge) the reception. For example, the communication device may transmit a HARQ feedback in a subframe of frame (m+1) of the TDD carrier with a subframe index 2, to respond the reception occurred in subframe of frame (m−1) of the TDD carrier with subframe index 9 and/or the reception occurred in subframe(s) of frame m of the FDD DL carrier with subframe indices 0, 1, 2, . . . , 7 and/or 8. Comparing examples in FIG. 22 and FIG. 23, the reception in the subframe with subframe index 2 may be acknowledged in the present example. Thus, more flexibility is provided by using a newly defined timeline. In other words, a rule for responding a HARQ feedback in the TDD system is utilized in the present example, to handle the communication operation.

Figure 24:
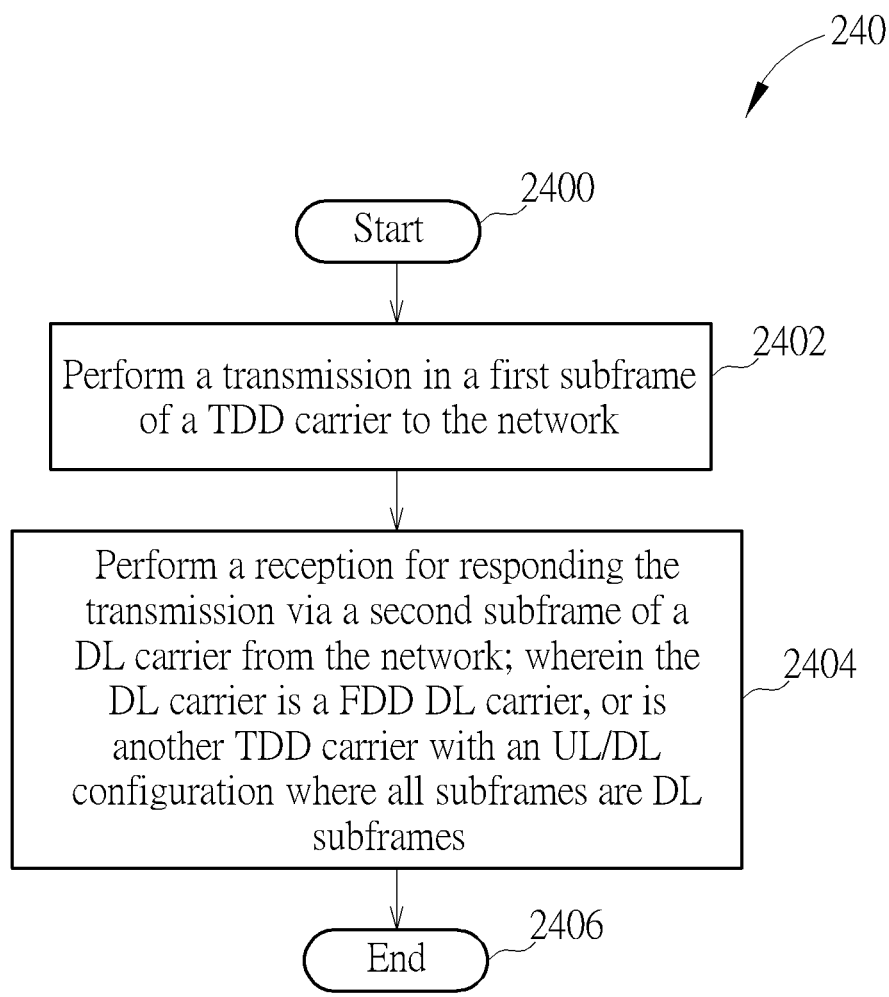
FIG. 24 is a flowchart of a process according to an example of the present invention.

FIG. 24 is a flowchart of a process 240 according to an example of the present invention. The process 240 may be utilized in a communication device shown in FIG. 2, for handling a TDD-FDD joint operation. The process 240 may be compiled into the program code 314 and includes the following steps:

Step 2400: Start.

Step 2402: Perform a transmission in a first subframe of a TDD carrier to the network.

Step 2404: Perform a reception for responding the transmission via a second subframe of a DL carrier from the network; wherein the DL carrier is a FDD DL carrier, or is another TDD carrier with an UL/DL configuration where all subframes are DL subframes.

Step 2406: End.

According to the process 240, the communication device performs a transmission in a first subframe of a TDD carrier to the network, and performs a reception for responding the transmission via a second subframe of a DL carrier from the network. The DL carrier may be a FDD DL carrier, or may be another TDD carrier with an UL/DL configuration where all subframes are DL subframes. That is, the transmission and the reception may be performed in different types of carriers. Note that the first subframe may be in a first frame, and the second subframe may be in a second frame. The first frame and the second frame may be the same frame or different frames, and may be determined according to the same rule used for determined the first subframe and the second subframe. In addition, subframe indices of the first subframe and the second subframe may be the same, if the first subframe and the second subframe are in different frames. In the process 240, the FDD DL carrier may be a primary carrier (e.g., primary component carrier, primary cell), and the TDD carrier may be a secondary carrier (e.g., secondary component carrier, secondary cell).

In one example, the TDD carrier may be another FDD (e.g., UL or DL) carrier. In another example, the TDD carrier may be another FDD (e.g., UL or DL) carrier configured with a TDD UL/DL configuration. For example, the transmission may include at least one packet, the reception comprises a HARQ feedback for responding the at least one packet in the transmission.

A method according to which the second subframe in the process 240 is determined is not limited. For example, the second subframe may be a (e.g., predetermined) number of subframes after the first subframe, and the number of subframes may be a constant regardless of a subframe index of the first subframe. That is, subframe indices of the first subframe and the second subframe may be n and (n+k), respectively, wherein n and k are positive integers. Taking FDD rule as an example, k is 4 regardless of the subframe index of the first subframe. In another example, the second subframe may be determined according to a reference timeline. The reference timeline may be determined according to a UL/DL configuration of the TDD carrier, or may be determined according to a UL/DL configuration configured by a higher layer signaling (e.g., RRC signaling). In another example, the reference timeline may be a newly defined timeline (e.g., modified from a timeline of the UL/DL configuration of the TDD carrier). The reception may be performed via a PHICH of the second subframe of the DL carrier. The transmission may be performed via a PUSCH of the first subframe of the TDD carrier.

Thus, the communication operation (e.g., TDD-FDD joint operation) can be realized by the communication device according to the above description. Bandwidth efficiency and flexibility of the wireless communication system can be improved.

Figure 25:
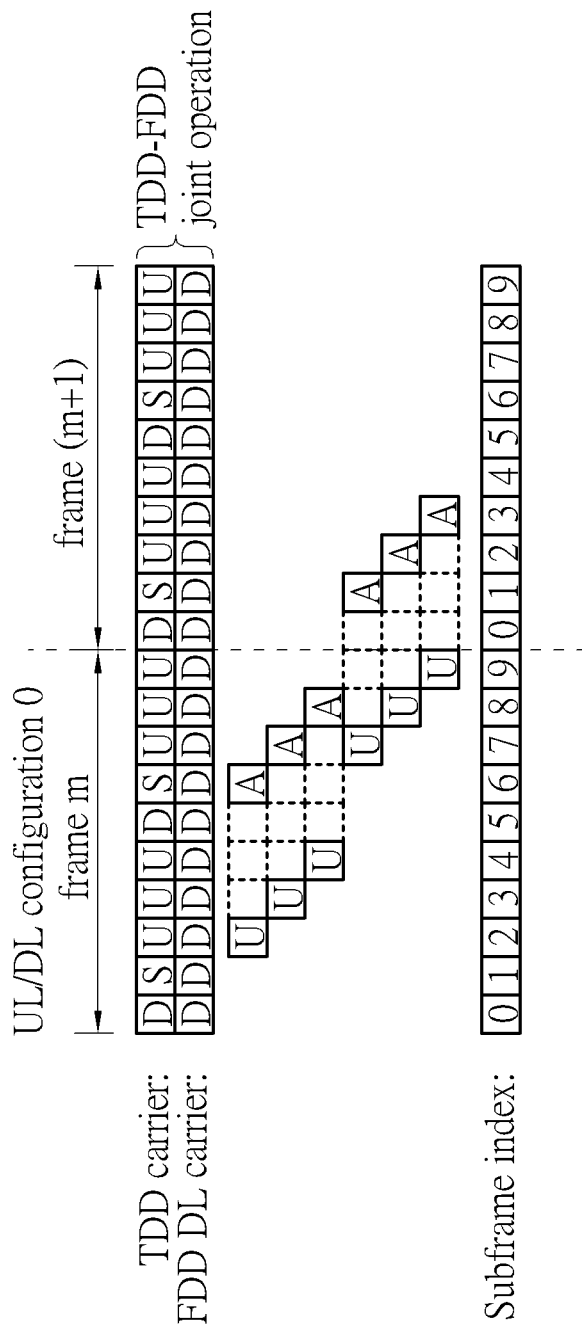
FIG. 25 is a schematic diagram of HARQ-feedback timeline for HARQ feedback(s) according to an example of the present invention.

FIG. 25 is a schematic diagram of HARQ-feedback timeline for HARQ feedback(s) according to an example of the present invention. A TDD carrier and a FDD DL carrier are shown in FIG. 25, wherein a UL/DL configuration of the TDD carrier is the UL/DL configuration 0. The communication device performs a transmission (e.g., of packet(s), message(s) or control information) via the TDD carrier. According to the previous description, the communication device may transmit one or more packets in a first subframe of the TDD carrier with subframe index n (e.g., 2, 3, 4, 7, 8 and/or 9) to the network. Then, the communication device may receive a HARQ feedback in a second subframe of the FDD DL carrier with a subframe index (n+4) (e.g., 1, 2, 3, 6, 7 and/or 8) from the network regardless of the subframe index of the first subframe, and the HARQ feedback is for responding (i.e., acknowledging) the transmission. For example, the communication device may receive a HARQ feedback in a subframe of frame m of the FDD DL carrier with subframe index 8, and the HARQ feedback is for responding the transmission occurred in a subframe of frame m of the TDD carrier with subframe index 4. In other words, a rule for responding a HARQ feedback in the FDD system is utilized in the present example, to handle the communication operation.

Operation of a HARQ process is discussed previously, and is not narrated herein.

It should be noted that, according to the FIG. 23, the communication device may receive one or more packets in a first subframe of the FDD DL carrier with subframe index n (e.g., 0, 1, 2, . . . , 8 and/or 9) from the network. Then, the communication device may transmit a HARQ feedback in a second subframe of the TDD carrier with a subframe index k according to the newly defined timeline to the network, to respond (i.e., acknowledge) the reception. In other words, for the FDD DL carrier, a rule for responding a HARQ feedback in the TDD system is utilized in the present example, to handle the communication operation (e.g., TDD-FDD joint operation). In this situation, the maximum number of HARQ processes of the FDD DL carrier needs to be modified when the TDD carrier is jointly operated with the FDD DL carrier.

Figure 26:
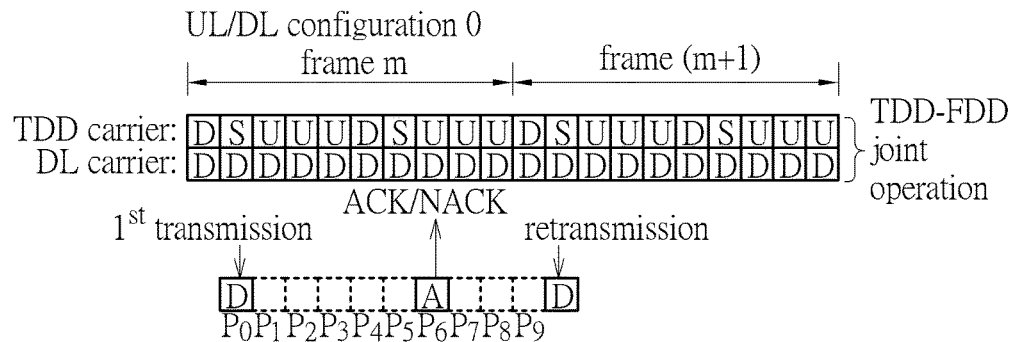
FIGS. 26 and 27 are schematic diagrams of the number of HARQ processes according to an example of the present invention.
Figure 26:
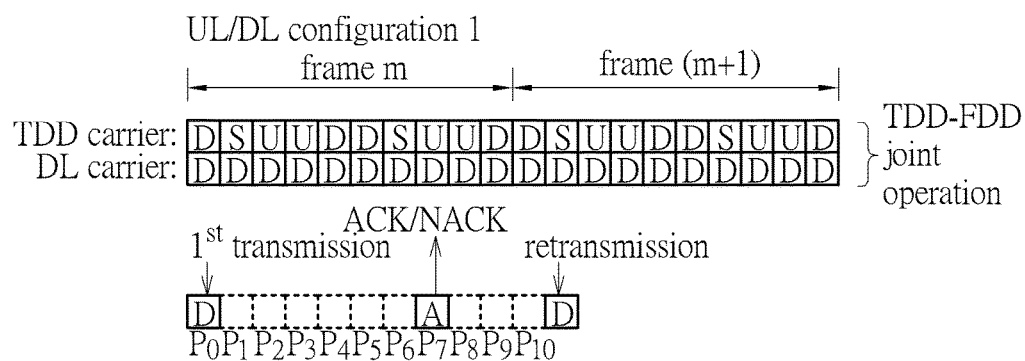
Figure 26:
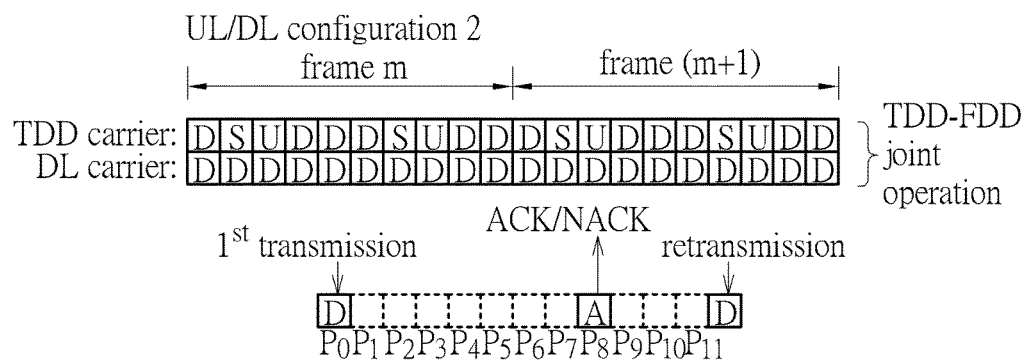
Figure 27:
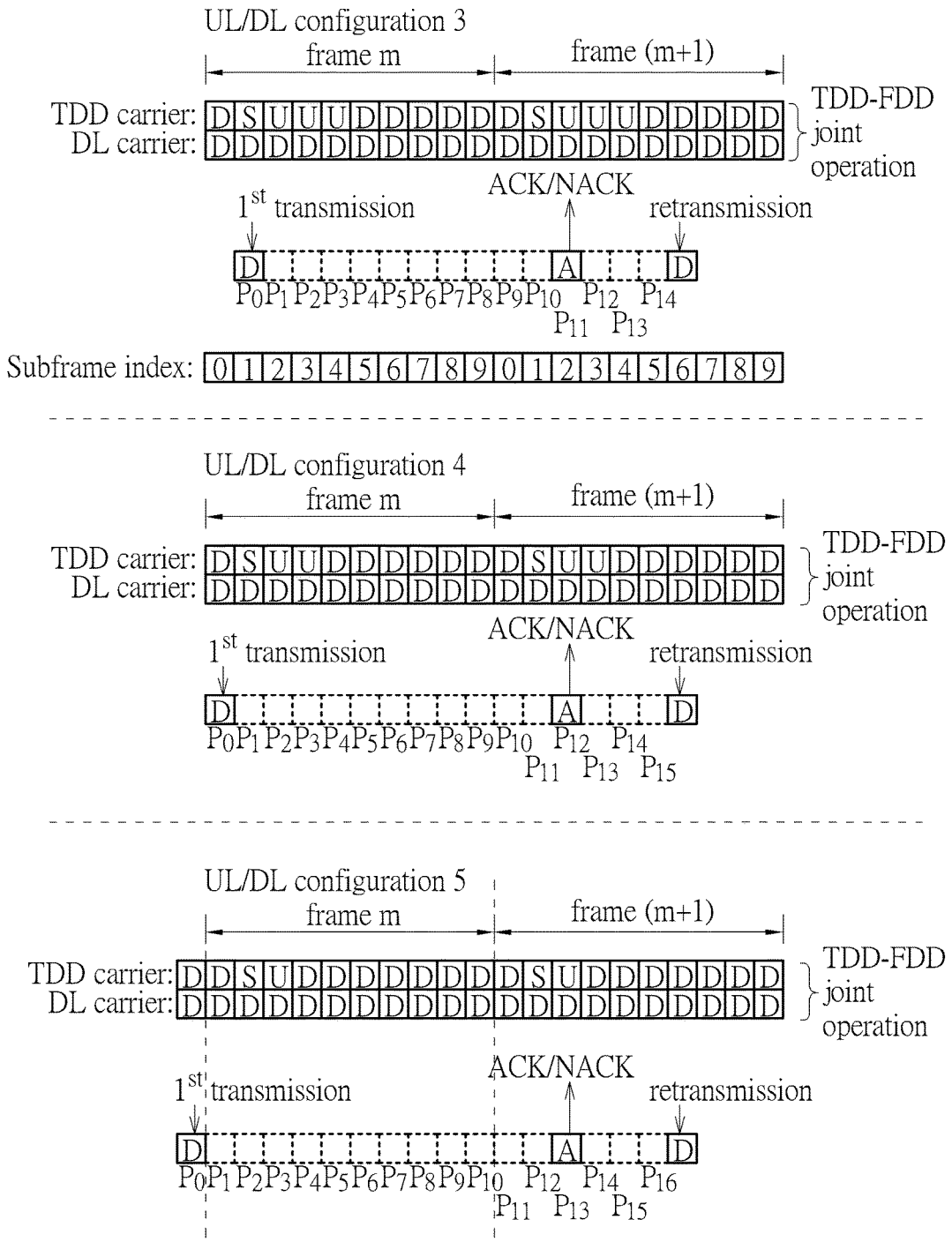

FIGS. 26 and 27 are schematic diagrams of the number of HARQ processes according to an example of the present invention. As shown in FIGS. 26 and 27, the communication device communicates with the network via a TDD carrier and a FDD DL carrier. Taking the UL/DL configuration 0 as an example, the first transmission from the network (i.e., reception for the communication device) may occur in a subframe of frame m of the FDD DL carrier with subframe index 1. Then, the communication device may transmit a HARQ feedback for responding the first transmission in the subframe of frame m of the TDD carrier with subframe index 7. The network may perform a retransmission, if the HARQ feedback is an NACK. The retransmission from the network may occur in a subframe of frame (m+1) of the FDD DL carrier with subframe index 1. At most 10 HARQ processes $p_0$-$p_9$ may happen between the first transmission and the retransmission, as shown at the top of FIG. 26, because the number of DL subframes of the FDD DL carrier therebetween is 10. Thus, when the FDD DL carrier is jointly operated with the TDD carrier and the TDD carrier is configured with the UL/DL configuration 0, the maximum number of HARQ processes, $M_{DL\_HARQ}$, for the FDD DL carrier is 10. Similarly, when the FDD DL carrier is jointly operated with the TDD carrier and the TDD carrier is configured with the UL/DL configurations 1-5, $M_{DL\_HARQ}$ for the FDD DL carrier are 11, 12, 15, 16 and 17, respectively, according to the number of processes between the first transmission and the retransmission, as shown in FIGS. 26 and 27.

According to the above description, especially the process 180 and the description related to the computation of $M_{DL\_HARQ}$, $M_{DL\_HARQ}$ for the FDD DL carrier can be obtained according to the present invention.

FIG. 28 is a table 108 of $M_{DL\_HARQ}$ according to an example of the invention. The results for the FDD DL carrier are shown in FIG. 28. It should be noted that $M_{DL\_HARQ}$ in the table 108 determined according to the present invention is at least equal or greater than $M_{DL\_HARQ}$ determined according to the prior art. When the FDD DL carrier is jointly operated with the TDD carrier and the TDD carrier is configured with the UL/DL configuration 5, it should be noted that $M_{DL\_HARQ}$ of the FDD DL carrier should be 17 according to the above description. However, $M_{DL\_HARQ}$ is set as 16 in the table 280, because up to 4 bits are available in DCI for indicating a HARQ process number according to the standard, i.e., an upper limit of 16 is introduced by the DCI. Thus, when the FDD DL carrier is jointly operated with the TDD carrier and the TDD carrier is configured with the UL/DL configuration 5, $M_{DL\_HARQ}$ is set as 16 for the FDD DL carrier according to both the present invention and the standard.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SIP), a computer on module (COM), and the communication device 30.

To sum up, the present invention provides a method of handling TDD-FDD joint operation for a communication device. Resources of the TDD carrier and the FDD carrier can be used efficiently according to the present invention. Thus, bandwidth efficiency and flexibility of the wireless communication system can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a communication operation, comprising:
   a storage device; and
   a processing circuit, coupled to the storage device, wherein the storage device stores instructions, and the processing circuit is configured to execute the instructions of:
   performing a reception in a first subframe of a time-division duplexing (TDD) carrier from a network; and
   performing a transmission for responding to the reception via a second subframe of a uplink (UL) carrier to the network;
   wherein the UL carrier is a frequency-division duplexing (FDD) UL carrier, or is another TDD carrier with an UL/downlink (DL) configuration where all subframes are UL subframes;
   wherein the reception comprises at least one packet, and the transmission comprises a hybrid automatic repeat request (HARQ) feedback for responding to the at least one packet in the reception;
   wherein a HARQ process number of the HARQ feedback is not greater than a maximum number of HARQ processes, $M_{DL\_HARQ}$, determined according to the reception and the transmission;
   wherein $M_{DL\_HARQ}$ for a UL/DL configuration 4 is 8, or $M_{DL\_HARQ}$ for a UL/DL configuration 5 is 8.

2. The communication device of claim 1, wherein the TDD carrier is another FDD carrier configured with a TDD UL/DL configuration.

3. The communication device of claim 1, wherein the reception comprises a UL grant, and the transmission is performed according to the UL grant.

4. The communication device of claim 1, wherein the second subframe is a number of subframes after the first subframe, and the number of subframes is a constant regardless of a subframe index of the first subframe.

5. The communication device of claim 1, wherein the second subframe is determined according to a reference timeline.

6. The communication device of claim 5, wherein the reference timeline is determined according to a UL/DL configuration of the TDD carrier, or is determined according to a UL/DL configuration configured by a higher layer signaling.

7. The communication device of claim 5, wherein the reference timeline is a newly defined timeline.

8. The communication device of claim 1, wherein the reception is performed via a physical DL shared channel (PDSCH) of the first subframe of the TDD carrier or via a physical DL control channel (PDCCH) of the first subframe of the TDD carrier.

9. The communication device of claim 1, wherein the transmission is performed via a physical UL shared channel (PUSCH) of the second subframe of the UL carrier or via a physical UL control channel (PUCCH) of the second subframe of the UL carrier.

10. A communication device for handling a communication operation, comprising:
    a storage device; and
    a processing circuit, coupled to the storage device, wherein the storage device stores instructions, and the processing circuit is configured to execute the instructions of:
    performing a transmission in a first subframe of a uplink (UL) carrier to a network; and
    performing a reception for responding to the transmission via a second subframe of a time-division duplexing (TDD) carrier from the network;
    wherein the UL carrier is a frequency-division duplexing (FDD) UL carrier, or is another TDD carrier with an UL/downlink (DL) configuration where all subframes are UL subframes;
    wherein the second subframe is a number of subframes after the first subframe and the number of subframes is a constant regardless of a subframe index of the first subframe;

wherein the reception is performed via a physical HARQ indicator channel (PHICH) of the second subframe of the TDD carrier.

11. The communication device of claim 10, wherein the TDD carrier is another FDD carrier configured with a TDD UL/DL configuration.

12. The communication device of claim 10, wherein the transmission comprises at least one packet, and the reception comprises a hybrid automatic repeat request (HARQ) feedback for responding to the at least one packet in the transmission.

13. The communication device of claim 12, wherein if the HARQ feedback is not received successfully due to that the second subframe is not valid for performing the reception, the communication device determines that the HARQ feedback which is not received is an acknowledgement (ACK).

14. The communication device of claim 10, wherein the transmission is performed via a physical UL shared channel (PUSCH) of the first subframe of the UL carrier.

15. A communication device for handling a communication operation, comprising:
a storage device; and
a processing circuit, coupled to the storage device, wherein the storage device stores instructions, and the processing circuit is configured to execute the instructions of:
performing a reception in a first subframe of a downlink (DL) carrier from a network; and
performing a transmission for responding to the reception via a second subframe of a time-division duplexing (TDD) carrier to the network;
wherein the DL carrier is a frequency-division duplexing (FDD) DL carrier, or is another TDD carrier with an uplink (UL)/DL configuration where all subframes are DL subframes;
wherein the reception comprises at least one packet, and the transmission comprises a hybrid automatic repeat request (HARQ) feedback for responding to the at least one packet in the reception;
wherein a HARQ process number of the HARQ feedback is not greater than a maximum number of HARQ processes, $M_{DL\_HARQ}$, determined according to the reception and the transmission;
wherein $M_{DL\_HARQ}$ for a UL/DL configuration 0 is 10, $M_{DL\_HARQ}$ for a UL/DL configuration 1 is 11, $M_{DL\_HARQ}$ for a UL/DL configuration 2 is 12, $M_{DL\_HARQ}$ for a UL/DL configuration 3 is 15, or $M_{DL\_HARQ}$ for a UL/DL configuration 4 is 16.

16. The communication device of claim 15, wherein the TDD carrier is another FDD carrier configured with a TDD UL/DL configuration.

17. The communication device of claim 15, wherein $M_{DL\_HARQ}$ for a UL/DL configuration 5 is 16, or $M_{DL\_HARQ}$ for a UL/DL configuration 6 is 11.

18. The communication device of claim 15, wherein the reception comprises a UL grant, and the transmission is performed according to the UL grant.

19. The communication device of claim 15, wherein the second subframe is a number of subframes after the first subframe, and the number of subframes is a constant regardless of a subframe index of the first subframe.

20. The communication device of claim 15, wherein the second subframe is determined according to a reference timeline.

21. The communication device of claim 20, wherein the reference timeline is determined according to a UL/DL configuration of the TDD carrier, or is determined according to a UL/DL configuration configured by a higher layer signaling.

22. The communication device of claim 20, wherein the reference timeline is a newly defined timeline.

23. The communication device of claim 15, wherein the reception is performed via a physical DL shared channel (PDSCH) of the first subframe of the DL carrier or via a physical DL control channel (PDCCH) of the first subframe of the DL carrier.

24. The communication device of claim 15, wherein the transmission is performed via a physical UL shared channel (PUSCH) of the second subframe of the TDD carrier or via a physical UL control channel (PUCCH) of the second subframe of the TDD carrier.

25. The communication device of claim 10, wherein the second subframe is determined according to a reference timeline.

26. The communication device of claim 25, wherein the reference timeline is determined according to a UL/DL configuration of the TDD carrier, or is determined according to a UL/DL configuration configured by a higher layer signaling.

27. The communication device of claim 25, wherein the reference timeline is a newly defined timeline.

* * * * *